United States Patent
Nakano

[11] Patent Number: 6,137,041
[45] Date of Patent: Oct. 24, 2000

[54] MUSIC SCORE READING METHOD AND COMPUTER-READABLE RECORDING MEDIUM STORING MUSIC SCORE READING PROGRAM

[75] Inventor: Seiji Nakano, Hamamatsu, Japan

[73] Assignee: Kabashiki Kaisha Kawai Gakki, Hamamatsu, Japan

[21] Appl. No.: 09/254,282

[22] PCT Filed: Jun. 24, 1998

[86] PCT No.: PCT/JP98/02806

§ 371 Date: Mar. 3, 1999

§ 102(e) Date: Mar. 3, 1999

[51] Int. Cl.[7] .......... G09B 15/00; G09B 15/02; G09B 15/08
[52] U.S. Cl. .......... 84/470 R; 84/477 R; 84/483.2
[58] Field of Search .......... 84/462, 465, 470 R, 84/471 R, 477 R, 483.1, 483.2, 484

[56] References Cited

U.S. PATENT DOCUMENTS

| | | | |
|---|---|---|---|
| 5,665,927 | 9/1997 | Taki et al. | 84/609 |
| 5,864,631 | 1/1999 | Shutoh | 382/113 |
| 5,998,721 | 12/1999 | Lepinski | 84/483.2 |

FOREIGN PATENT DOCUMENTS

| | | |
|---|---|---|
| 7-129159 | 5/1995 | Japan . |
| 7-225817 | 8/1995 | Japan . |
| 9-97060 | 4/1997 | Japan . |
| 9-97061 | 4/1997 | Japan . |

*Primary Examiner*—David Martin
*Assistant Examiner*—Marlon Fletcher
*Attorney, Agent, or Firm*—Christie, Parker & Hale, LLP

[57] ABSTRACT

A sign recognizing step of recognizing all signs, including notes, of a music score, a notation estimating step of estimating a drum notation in a drum part of the music score based on information obtained by the step, a musical instrument allocating step of allocating actual tone generating musical instruments to the recognized signs of the drum part according to the drum notation estimated by the step, and a data converting step of converting into a playable and/or displayable music score data format are executed. With this arrangement, the notation of each of the drum scores described by various notations can be recognized so that it can be converted into a playable data format with less operations.

36 Claims, 13 Drawing Sheets

FIG. 9
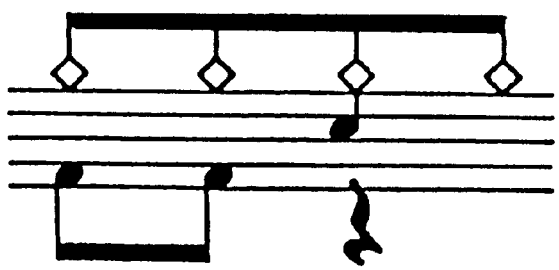
(a)
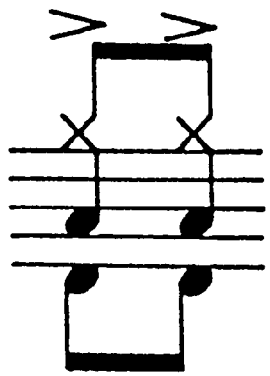
(b)
FIG. 10
(a) 
(b) 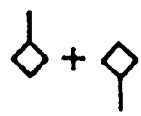
(c) 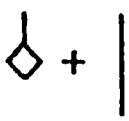

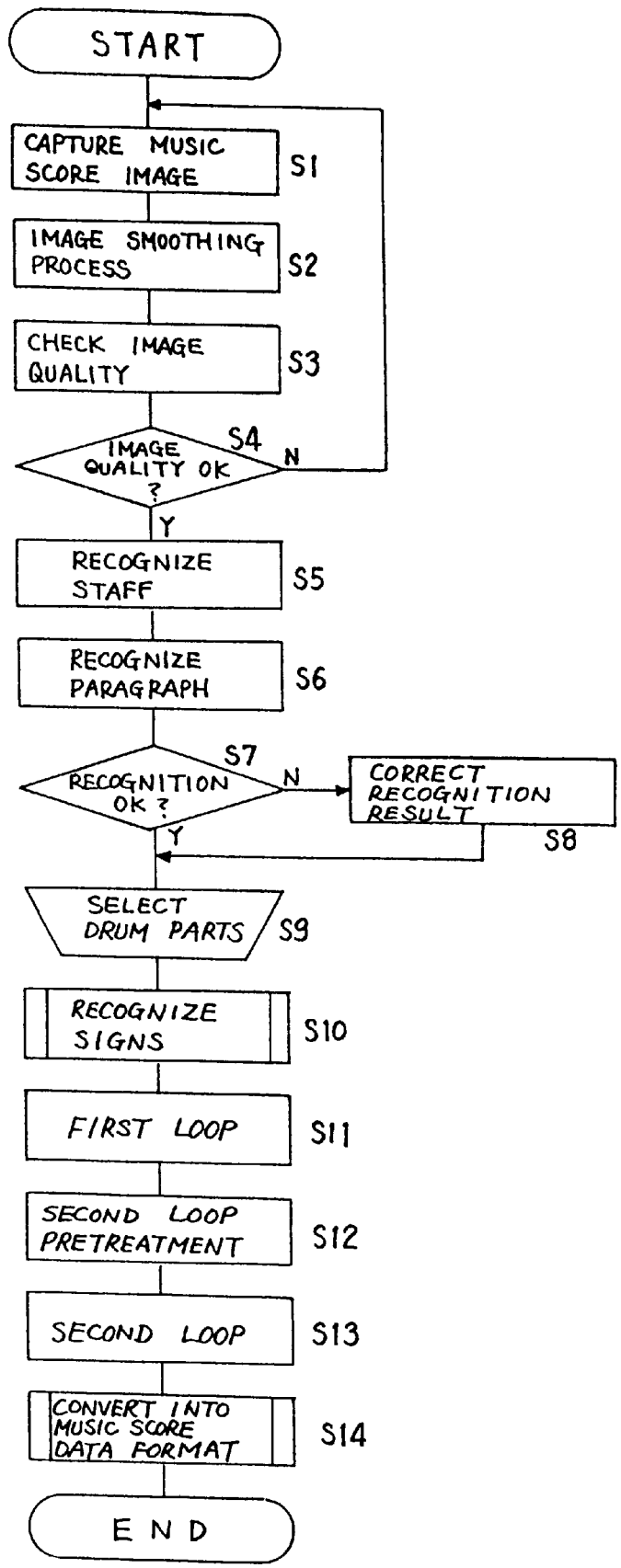
FIG_14

FIG.15  ● × ⊗ ◇ ○ ◈ △ R C
FIG.16
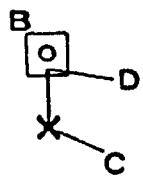
FIG.17
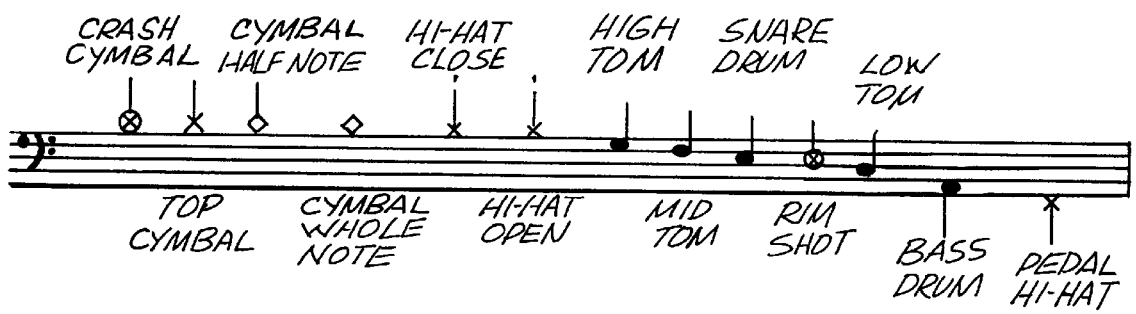
FIG.18
(a)
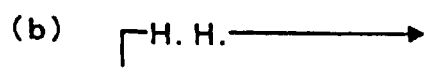
(b)
(c)

FIG. 25
(a)
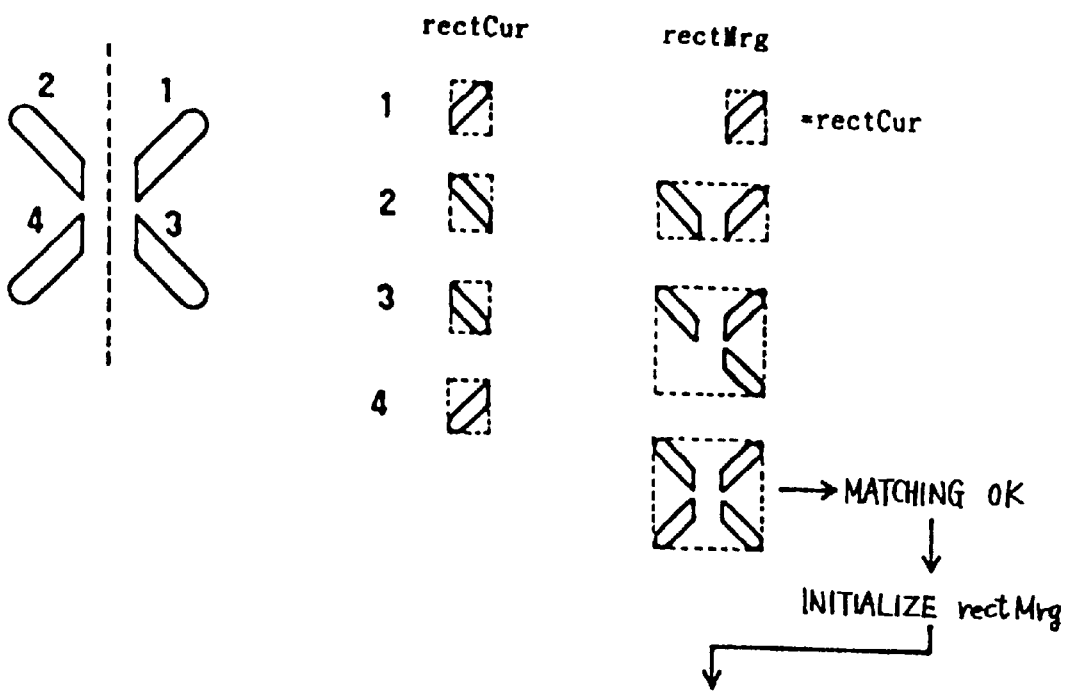
(b)
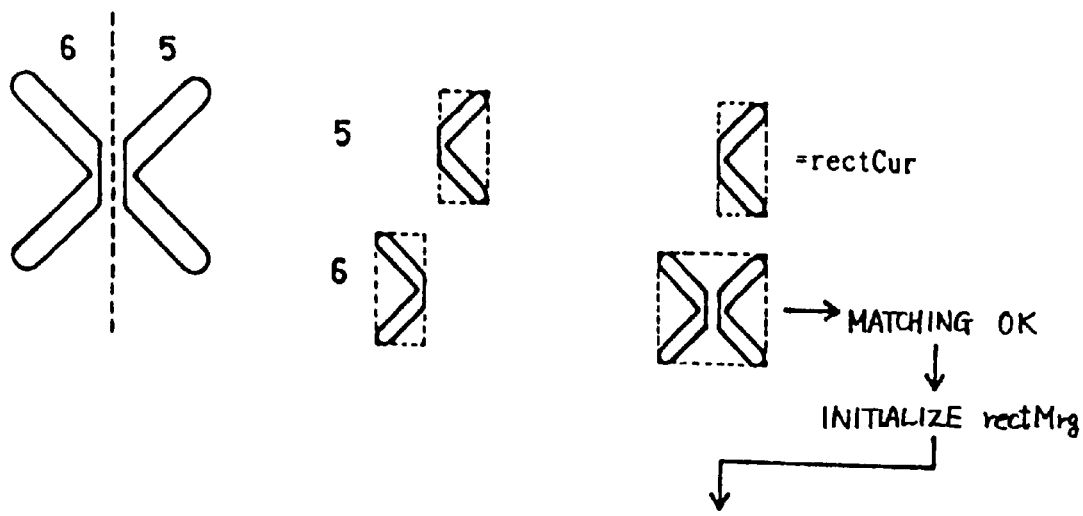

FIG. 28
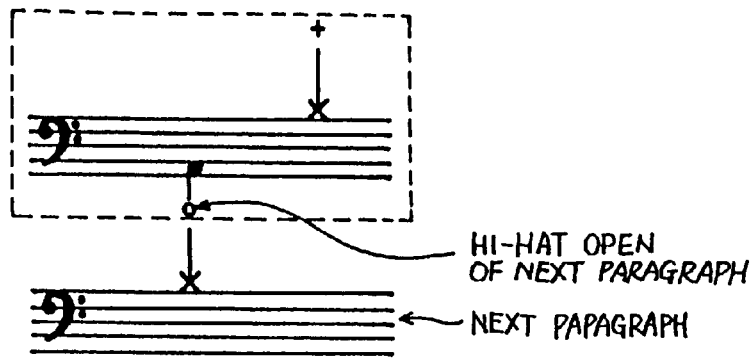
FIG. 29
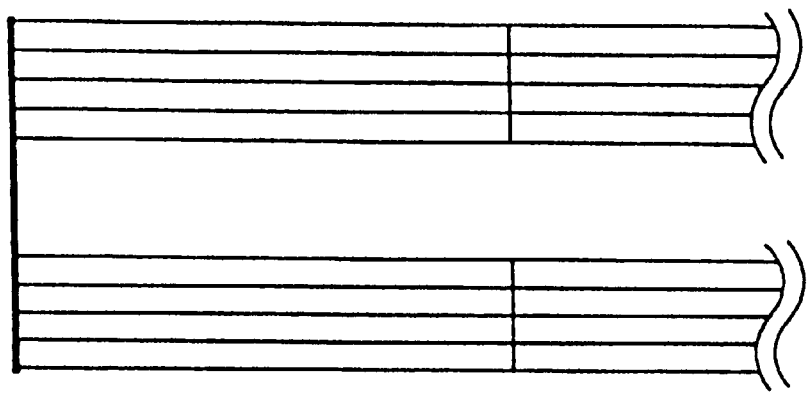
FIG. 30
(a) 
(b) 
(c) 
(d) 

US 6,137,041

MUSIC SCORE READING METHOD AND COMPUTER-READABLE RECORDING MEDIUM STORING MUSIC SCORE READING PROGRAM

TECHNICAL FIELD

The present invention relates to a music score reading method which enables reading of a music score, particularly a drum score, and a computer-readable recording medium storing a program which executes music score reading.

BACKGROUND ART

Normally, when mechanically recognizing a music score, staff recognition and recognition of paragraphs as shown in FIG. 29 are carried out, thereafter, the staff is eliminated. Then, using various methods, a head of a note, such as a black head b shown at (a) in FIG. 30 or a white head w shown at (b) in the same figure, a stem t, continuous with the head, shown at (c) in the same figure, a flag f, continuous with the stem, shown at (d) in the same figure, and others are recognized.

In contrast, notation of a drum score, which is a music score of a drum set, is not fixed based on the historical cause of the musical instrument and the cause on playing.

Since there exists no general notation, if recognition of a particular notation is aimed at, generality of drum score recognition is lost.

On the other hand, if various notations are aimed to be recognized, it is not possible, only by recognizing a notated sign according to the notation itself, to specify which drum instrument (drum tone) plays that note, and thus the drum score can not be played as it is.

Further, if aiming to recognize the drum score regardless of a particular notation as described above, it is required, for correctly playing the recognition results, to designate what drum tone (drum instrument) is actually represented by that sign (including a note). A user may carry out such designation, but in this case, it is necessary that the user knows well the drum score notation. Further, for such designation, a complicated interface is used and a designation operation becomes complicated so that numerous correction steps are required, resulting in increase of the total correction cost.

In addition, even if a notation type is designated before recognizing a drum score and recognition is executed based on the designated notation type so as to make unnecessary correction after the recognition, the user side is similarly required to have the precise knowledge about the notation.

The foregoing problems have impeded dealing with the drum score in the conventional music score recognition technique.

Among heads notated on a drum score, those notes other than a black head or a white head like in a normal music score are described by thin lines, such as (X) and (◊), and there exist various other types. Therefore, they can not be detected using the thick/thin separation (see JP-A-9-97060: method wherein a portion formed by a thin line is separated from image data, then a sign formed by the thin line is detected therefrom, then a thick sign is detected from the remaining image so as to recognize a sign appearing on a music score) or the ellipse detection (method wherein a black head or a white head used as a head of a normal note is recognized using the equation of ellipse) which have been used for note recognition of the normal music score.

Other than the foregoing, there exist problems, which can not be solved by the conventional method, such as tie coupling to heads and a chord having two or more heads abutting in the longitudinal direction. There are further problems, which do not exist in the normal music score, such that the position where a head is coupled to a stem differs depending on a music score and that there is a note of a type wherein a head is located on the midway of a stem so as to cut the stem.

The present invention has been made in view of the foregoing problems of the prior art. The first object of a structure of the present application is to provide a structure which can recognize notations of drum scores described by various notations for conversion into a playable data format with less operations.

The second object of a structure of the present application is to provide a structure which enables recognition of a drum note in a drum score different from a normal music score for conversion into a playable and/or displayable data format.

SUMMARY OF THE INVENTION

Accordingly, a structure of the invention according to claim 1 is characterized by comprising a sign recognizing step of recognizing all signs, including notes, of a music score, a notation estimating step of estimating a drum notation in a drum part of the music score based on information obtained by the step, a musical instrument allocating step of allocating actual tone generating musical instruments to the recognized signs of the drum part according to the drum notation estimated by the step, and a data converting step of converting into a playable and/or displayable music score data format. A structure of a recording medium of claim 9 provides it in the form of a computer-readable recording medium storing a music score reading program for executing those functions. Specifically, a music score reading program for executing a sign recognizing function of recognizing all signs, including notes, of a music score, a notation estimating function of estimating a drum notation in a drum part of the music score based on information obtained by the function, a musical instrument allocating function of allocating actual tone generating musical instruments to the recognized signs of the drum part according to the drum notation estimated by the function, and a data converting function of converting into a playable and/or displayable music score data format is provided in the form of a structure stored in the recording medium.

Upon recognizing the drum score, it is not possible to univocally allocate drum tones (drum instruments) based on the recognition of the signs on the music score. Therefore, in the structure of the present invention, after all the signs of the music score are recognized, the drum notation is estimated based on such information, then the drum tones are allocated so as to be converted into a playable and/or displayable data format.

In the music score reading method (recording medium), the signs in the drum part of the music score recognized by the sign recognizing step (function) include a head, a stem and a flag of a drum note, a sign relating to a drum note and a character string unique in a drum score and, upon recognizing the sign relating to the drum note, the sign relating to the drum note as well as association with the drum note are detected. As described above, since the accurate estimation can be achieved only after finishing the recognition of all the signs in the drum part of the music score, it is necessary to precisely recognize at least those signs and the association thereof before carrying out the estimation. Naturally, when estimating the drum notation, recognition of staff positions of the drum heads is also an important judging factor in addition to the precise recognition of the signs and the association thereof, as will be described later.

The notation estimating step (function) estimates the drum notation based on information obtained by a sign recognizing step (function) and including at least a staff position of a drum head, a kind of a drum head, a hi-hat open sign relating to a drum note, a hi-hat close sign relating to a drum note, an accent sign relating to a drum note, a stem of a drum note, a flag of a drum note, a character string for designation of a drum tone of a note, a tone length determined by the flag of the drum note, and another tone length determined by a head kind based on existence of the tone length of the drum note derived by the flag.

With respect to the drum instruments of cymbals and the other drum instruments, depending on the kinds thereof, display positions on the staff (pitches) are changed (there are musical instruments whose positions are not univocally determined), and further, different drum heads are used (the same drum heads may also be used; there is a case wherein the same drum heads and the same staff positions are used). Accordingly, the range of drum instrument estimation is narrowed depending on positions of the drum heads on the staff, and further, adequacy of the estimation is enhanced depending on the kinds of the drum heads.

However, with respect to the cymbals, when a drum head is a blank diamond (◊), there is a case wherein it can not be immediately judged whether it designates a half note or a whole note, or a particular cymbal. In case of a drum head being (X), immediate judgment can not be done similarly.

In these cases, if there is a hi-hat open sign (°) associated with the drum note, it always represents a hi-hat, and the head of the drum note assigned such a sign possibly represents a hi-hat. However, if such a sign is not assigned, even the same head may also represent hi-hat close, a crash cymbal or a top cymbal.

If there is an accent sign (˃) or (ˆ) associated with a drum note, it generally means to give an accent to that note, however, it is also possible to designate a crash cymbal. In this case, judgment can be done to some degree from a kind and a staff position of the drum head with an accent sign used in the music score.

In such a case, if a character string for designation of a drum tone of a note is assigned thereto, priority is given to the character string and it is possible that another sign is estimated therefrom.

Further, if the foregoing diamond head is attached with a stem and a flag attached to the stem, the flag designates a tone length of an eighth note or a sixteenth note (a tone length determined by a flag of a drum note). In this case, the head does not designate a half note or a whole note, but designates a particular drum instrument, and there is a case wherein a tone length of another drum note is derived therefrom (another tone length is determined by a head kind based on existence of a tone length of another drum note derived by a flag).

Accordingly, the estimation of the drum notation is carried out based on the information about the foregoing signs etc.

The notation estimating step (function) actually estimates a drum notation with respect to drum instruments other than cymbals such that, if heads exist in a third space of the staff and a black head and a head of another kind are detected, the black head is set to a snare drum while (R) or the head other than the black head is set to a rim shot and, if heads exist in the third space of the staff and only the black heads are detected and further a character string representing the rim shot is detected, the black head designated by the character string is set to the rim shot while the other black head is set to the snare drum. The snare drum and the rim shot are both represented by the head located in the third space of the staff. In this case, the snare drum is normally represented by the black head, while the rim shot is represented by another head such as (R), or by the black head with the character string. Thus, the foregoing estimation can be established.

The notation estimating step (function) actually estimates a drum notation with respect to drum instruments other than cymbals such that, if a head exists below a first line of the staff and is other than a black head, the head is set to a pedal hi-hat.

Normally, the pedal hi-hat is notated in the lower first space as a head (X). However, it may be shifted to a lower side for avoiding the bass drum. In consideration of a possibility of wrong recognition, the note, other than the black head, below the first line is set to be the pedal hi-hat as described above.

The notation estimating step (function) actually estimates a drum notation with respect to drum instruments other than cymbals such that, if black heads are detected in ranges, excluding a third space, where they are notated to represent a bass drum and toms, when a lowermost step is no higher than a given pitch, the corresponding black heads are set to the bass drum while the others are set to the toms of a plurality of pitches and, when the lowermost step is higher than the given pitch, all the black heads are set to the toms of a plurality of pitches.

Normally, the bass drum and the tom are each notated by the black head, wherein the bass drum is notated in the first space and the tom is notated at the 1–4 pitch from the second line to the fifth line excluding the third line. However, there also exists a notation wherein the bass drum is notated in the lower first space. In this case, a possibility is high that the Low tom is notated in the first space (that is, at the same pitch as the normal bass drum). Like this, the range of the tom changes depending on the pitch of the bass drum. Therefore, the pitches, including the pitch of the bass drum, where the black heads exist are detected in the first process. Specifically, as described above, if the black heads are detected in the range from the lower first space to the fifth line of the staff excluding the third space and the lowermost step of the black heads exists in the range from the lower first space to the first space, a drum note representing a pitch of the lowermost step of the pitches where the black heads exist is set to the bass drum, a drum note representing a pitch of the step one-up therefrom is set to the Low tom, a drum note representing a pitch of the uppermost step is set to the High tom, and further, a drum note representing a pitch between the pitch of the Low tom and the pitch of the High tom excluding the third space is set to the Mid tom. On the other hand, if the black heads are detected in the range from the second line to the fifth line excluding the third space, a drum note representing a pitch of the lowermost step is set to the Low tom, a drum note representing a pitch of the uppermost step is set to the High tom, and further, a drum note representing a pitch between the pitch of the Low tom and the pitch of the High tom excluding the third space is set to the Mid tom.

The notation estimating step (function) estimates a drum notation with respect to drum instruments of cymbals such that, under a condition that drum heads other than a black head exist above a fourth space of the staff, drum notations are classified into a case where the drum heads exist at one staff position and a case where the drum heads exist at two staff positions, the classification is further divided depending on kinds of the drum heads and still further divided depending on tone lengths determined by flags of the drum notes and other tone lengths determined by the kinds of the heads based on existence of the tone lengths of the drum notes derived by the flags, a conversion table is prepared depending on the still further divided classification, and kinds of the drum instruments of cymbals estimated depending on the staff positions of the drum heads, the kinds of the drum heads, a hi-hat open sign relating to the drum notes, a hi-hat close sign relating to the drum notes, an accent sign relating to the drum notes and character strings for designation of drum tones of the notes are specified in the conversion table so as to estimate the drum notation based on the conversion table.

With respect to the drum instruments of cymbals, the drum notes are notated by the drum heads other than the black heads on the staff above the fourth space. In this case, there are a case wherein the drum heads are shown at one pitch (the staff position of the drum heads is one) and a case wherein the drum heads are shown at two pitches (the staff positions of the drum heads are two).

Further, depending on the kinds of the drum instruments of cymbals, the notation is normally carried out by changing the drum heads. For example, the probability is high according to musical instrument characteristics that a half note or a whole note represents the crash cymbal. Further, the probability is high on drum score histories that the head (◇) is notated as a half note or a whole note. The probability is high that if a whole note exists, a half note is notated by the same head as that of the whole note. The probability is low that the drum notes of the cymbals are notated at three or more pitches. When notated at two pitches, the lower step represents the hi-hat while the upper step represents the crash cymbal or the top cymbal. If both the crash cymbal and the top cymbal are notated at the upper step, the head of the top cymbal is represented by (X) while the crash cymbal is represented by another notation (changing the head or the like). Further, if there is only one kind of a cymbal (other than the hi-hat cymbals), it is the crash cymbal. The note whose head is (O) represents hi-hat open, while the hi-hat not associated with the sign (°) [or associated with the sign (⁺)] represents hi-hat close.

Naturally, there is also a case wherein it is found out that, due to tone lengths determined by flags of drum notes and other tone lengths determined by kinds of heads based on existence of the tone lengths of the drum notes derived by the flags, a head notated along with them differs from an initially estimated cymbal. For example, assuming that heads (◇) exist and that, before estimation, the head (◇) is handled as a whole note and the head (◇) with a stem is handled as a half note, if there exists the head (◇) with a stem and a flag representing an eighth note or a sixteenth note, it may be found out that the head (◇) with the stem actually represents a fourth note and thus the note with the head (◇) represents the top cymbal.

Therefore, as described above, the drum notations are classified into a case where the drum heads exist at one staff position and a case where the drum heads exist at two staff positions, the classification is further divided depending on kinds of the drum heads and still further divided depending on tone lengths determined by flags of the drum notes [the foregoing eighth note or sixteenth note in case of the head (◇), or the like] and other tone lengths [the fourth note represented by the head (◇) with the stem, or the like] determined by the kinds of the heads [the head (◇) or the like] based on existence of the tone lengths of the drum notes (the foregoing eighth note or sixteenth note, or the like) derived by the flags, a conversion table is prepared depending on the still further divided classification, and kinds of the drum instruments of cymbals estimated depending on the staff positions of the drum heads, the kinds of the drum heads, a hi-hat open sign relating to the drum notes, a hi-hat close sign relating to the drum notes, an accent sign relating to the drum notes and character strings for designation of drum tones of the notes are specified in the conversion table. Then, the drum notation is estimated based on the conversion table.

As the final step, the actual tone generating musical instruments are allocated to the recognized signs of the drum part according to the drum notation estimated by the notation estimating step (function), whereupon, if a value of the conversion table designates a half note relative to the drum note originally recognized as a quarter note before estimation, the drum note is converted to the half note. This is because tone lengths designated by various drum heads change depending on the notations.

For accomplishing the foregoing second object, a structure of claim 17 is characterized in that in a music score reading method of reading an image of a music score to recognize music signs therein for conversion into a playable and/or displayable music score format, a label of a head is separated using information of a stem and eliminating bits of the stem (hereinafter, elimination represents elimination of a bit plane of an image and is distinguished from deletion of data itself on the recognition result holding data), a stem candidate is scanned and the thus detected separated label around the stem candidate is matched with a dictionary so as to recognize a drum head sign, and then a process of coupling the recognized head and the stem candidate is carried out.

As described above, the heads of the drum score, other than the black head and the white head, are described by thin lines, such as (X) and (◇), and there exist various other types. Thus, they can not be detected by the thick/thin separation method or the ellipse detection method used in the note recognition of the normal music score. Therefore, like the normal sign recognition, the recognition is carried out by matching the separated/extracted label with the dictionary. However, due to existence of the stem, it is not possible to separate only the head as one label. Further, since there exist linked flags or chords, if the dictionary is prepared including the stems, the number of patterns becomes enormous and thus impossible. Therefore, in this structure, the head label is once separated using the stem information and the separated label is matched with the dictionary so as to be recognized in the same method for the normal sign recognition. Thereupon, the stem candidate separated from the head is scanned and the recognition of the drum head is carried out using the label around the stem candidate as a matching object, and then the matched head is finally coupled to the stem.

The foregoing structure is applicable to a computer-readable recording medium storing a music score reading program of claim 27. The structure thereof includes a program for executing a label separating function of separating a head label using information of a stem, a scanning function of scanning a stem candidate, a recognizing function of matching the separated label around the stem candidate detected by the scanning with a dictionary so as to recognize a drum head, and a coupling function of coupling the recognized head and the stem candidate.

In the foregoing structure, if the matching between the separated label and the dictionary fails, scanning of the stem candidate is further continued so that a process of coupling between a next detected head label and the foregoing separated label is carried out, and then matching with the dictionary is again executed. This is because, in a case as shown in FIG. 1, even if the stem is eliminated, no problem is caused for the recognition of the head, while, in a case as shown in FIG. 2, the head is separated into a plurality of labels after elimination of the stem. In such a case, since the first-executed matching fails, the label coupling is carried out thereafter to execute matching again so that the head can be recognized.

The foregoing structure is applicable to a computer-readable recording medium storing a music score reading program of claim 28. The structure thereof further includes a program for executing a matching judging function of judging whether matching between the separated label and the dictionary is successful, and a label coupling function of, if the matching fails, causing the scanning function to continue scanning of the stem candidate and performing a process of coupling a next detected head label and the separated label, wherein, after the label coupling, the recognizing function performs again matching between a coupled label and the dictionary.

Even when carrying out the foregoing label coupling after the dictionary matching failure and the re-matching process, the next detected head label itself used in the coupling process should be matched with the dictionary and, if a result of this matching has a higher preference degree, this recognition result should have priority.

The foregoing structure is applicable to a computer-readable recording medium storing a music score reading program of claim 29. The structure thereof is such that the next detected head label itself used in the coupling process is matched with the dictionary and, if a result of this matching has a higher preference degree, this recognition result has priority.

In a music score reading method of claim 18, it is preferable that the label coupling is repeatedly carried out, and preference degrees are given to recognition results respectively recognized through matching during the coupling so that the recognition results are determined in the order of higher preference degrees. It is possible that during the label coupling, prior to becoming a recognition rectangle which includes all the heads to be originally recognized, it may have the same shape as that of another head. Thus, upon executing the matching, it is preferable to assign the preference degrees to the recognition results. In case of the recognition result of the low preference degree, the next label scanning is carried out while holding that ID and that rectangle. If an ID of a higher preference degree is not found, it has priority. If a recognition object label formed during the label coupling is recognized as an ID different from an intended one, this may be stored in the dictionary as a reject label and, if recognized as this, it can be judged as recognition failure.

The foregoing structure is applicable to a computer-readable recording medium storing a music score reading program of claim 30. The structure thereof further includes a program for executing a preference degree assigning function of assigning preference degrees to recognition results respectively recognized through matching during the head recognition while the head recognition and the label coupling are repeatedly carried out, wherein the recognizing function corrects the recognition results in the order of higher preference degrees.

In the foregoing structure, if a tie is abutting the head, the label separation can not be performed. Therefore, the label separation is carried out by eliminating the tie, and the drum note including the head in abutment with the tie is recognized.

The foregoing structure is applicable to a computer-readable recording medium storing a music score reading program of claim 31. The structure thereof further includes a program for executing a tie eliminating function of eliminating a tie abutting a head, wherein the label separating function performs label separation after the elimination, and the recognizing function recognizes the head in abutment with the tie.

As shown in FIG. 3, if a musical instrument other than a normal drum set is notated on the same staff, it is possible that a chord with abutting heads (X) exists. In such a case, it is difficult to separate the respective heads and set recognition rectangles prior to the matching with the dictionary. Therefore, in a structure of claim 22, a coupled head with upper and lower abutting heads is recorded in the dictionary, and matching between the dictionary and a coupled head is carried out to recognize the coupled head.

The foregoing structure is applicable to a computer-readable recording medium storing a music score reading program of claim 32. The structure thereof is such that a coupled head with upper and lower abutting heads is recorded in the dictionary, and the recognizing function performs matching between the dictionary and a coupled head to recognize the coupled head.

By performing the matching with the dictionary while coupling the labels around the stem candidate as described above, a tremolo sign as shown in FIG. 4 can also be recognized. Particularly in case of the drum score, tremolo signs are relatively large in number. Since the tremolo sign has essentially the same thickness and essentially the same interval as those of linked flags, if no measure is taken, counting of flags may be carried out like in case of the linked flags so that it may be wrongly recognized as a note with a short tone length such as a thirty-second note. Therefore, in this structure, the tremolo sign is recorded in the dictionary in the form as shown in FIG. 5. After the tremolo sign is recognized and its sign bits are eliminated, a drum note which was displayed including the tremolo sign is recognized.

The foregoing structure is applicable to a computer-readable recording medium storing a music score reading program of claim 33. The structure thereof is such that a tremolo sign is recorded in the dictionary so that the recognizing function recognizes a tremolo sign, a program for executing a sign eliminating function of eliminating bits of the tremolo sign is further included and, after the elimination, a drum note which was displayed including the tremolo sign is recognized.

In the structure of this application, as carried out upon the recognition of the normal music score, the process of coupling between the head and the stem is carried out after recognizing the head. In case of the drum score, a unique process is required even in this coupling process. One reason is based on a positional relationship between the head and the stem. Specifically, as shown in FIG. 2, in case of a head other than a black head, there is a case wherein a stem is attached to the center of the head. It is rarely that heads are attached to both sides of a stem.

The recognition of the note is carried out by coupling between the head and the stem candidate. In the coupling, after coupling a first head of the stem, an intermediate head is coupled.

In case of the normal heads (black heads, white heads), there is a case wherein the heads are attached to both sides of the stem. The X-direction (transverse) position of the first head is determined (for example, if the stem is upward, the first head is only attached to the left of the stem). Thus, upon coupling the first head, an X-direction positional relationship between the stem and the head is limited to the left or right. At this time, as shown in FIG. 6, which one of ends of the stem the head is attached to (whether the stem is upward or downward) is determined based on a positional relationship between y coordinates of the middle point CC of the stem candidate in the Y direction (longitudinal direction) and the head center CY. Further, whether the first head or not is judged based on a distance between the end ST of the stem candidate and the head center CY, or a relationship between the end ST of the stem and an upper/lower end of the head ellipse, as shown in the same figure.

However, in case of the drum head, there is a case wherein the stem is located at the center of the head as seen in the X direction. Thus, even in case of the first head, limitation to the left or right is not performed (coupling possible at both) as shown at (a) and (b) in FIG. 7. Thereafter, for avoiding double coupling of the stem, a flag at the side of the head where the stem is attached is checked after the head stem coupling. In case of the drum head, as shown in FIG. 8, regardless of an actual X-direction positional relationship between the stem and the head center, a fixed direction is checked (if the stem is upward, the right side is checked). This check flag is stored as representing an attribute of data in the holding data of the head side for preventing double coupling of the stem upon coupling the head and the stem candidate.

In this structure, each head is provided with the flags for specifying a coupling position relative to the stem candidate depending on whether the stem candidate to be coupled is upward or downward, and coupling of the stem to a coupling position other than specified by the flag is disabled in the course of coupling between the head and the stem candidate.

Another reason for carrying out the unique coupling process in case of the drum score is that there exists a head which divides a stem as shown at (a) and (b) in FIG. 9. In an example of the figure, a first black head of the stem should be recognized as an eighth note rather than a fourth note. As shown in the same figure, with respect to the head dividing the stem, such a pattern is normal wherein the first head is a black head and there exists one dividing head. Thus, in this structure, the black head is not considered at first and, as shown in FIG. 10, the head dividing the stem and its upper and lower stem candidates are coupled to each other. Then, as shown at (b) in the same figure, drum notes with oppositely oriented stems sharing such a head are recognized. Thereafter, the note with the downward stem on the right side in the figure is deleted (not eliminating the bit plane of the image, but deleting the data itself on the recognition result holding data) and, as shown at (c) in the same figure, one obtained by coupling the upper and lower stems is set to a stem candidate (right side in the figure) which is finally coupled to the remaining head (black head).

The foregoing structure is applicable to a computer-readable recording medium storing a music score reading program of claim 34. The structure thereof is such that the coupling function performs coupling between the head dividing the stem and its upper and lower stem candidates and then the recognizing function recognizes drum notes with oppositely oriented stems sharing the head, wherein an execution program is included which has a downward note deleting function of deleting the note with the downward stem and a stem coupling function of coupling the upper and lower stems, and wherein the coupled stems are set to be a stem candidate which is then coupled to the remaining head by the coupling function.

Still another reason for carrying-out the unique coupling process in case of the drum score is that, upon recognizing the O head, if (°) representing hi-hat open exists close to the stem, it is possible that it is wrongly recognized as the head. As a measure against it, when the downward stem is not wished to be coupled to the O head, if the left-side flag is checked in advance, the stem is not coupled to the checked side (in general, coupling of the stem candidate to the flag-checked side is disabled).

If a sign (+) representing hi-hat close or a tuplet number as shown in FIG. 11 is wrongly recognized as a head and coupled as the first head of the stem, it may be recognized as a completely different note with an oppositely oriented stem. As a measure against it, these sign and tuplet number may be recorded in the dictionary as reject labels. On the other hand, in this structure, by utilizing that, as different from the normal music score, the stem orientation in the drum score can be limited to a certain degree, the stem is judged to be upward when a stem upper end extends above the staff and a stem lower end does not extend below the staff, that is, when the stem upper end is above the fifth line and the stem lower end is above the first line [it is also effective as a measure against wrong recognition of hi-hat open (°)], while the stem is judged to be downward when the stem lower end extends below the staff and the stem upper end does not extend above the staff, that is, when the stem lower end is below the first line and the stem upper end is below the fifth line, so as to couple the first head and the stem candidate.

The foregoing structure is applicable to a computer-readable recording medium storing a music score reading program of claim 35. The structure thereof further includes a program for executing a stem orientation judging function of judging a stem to be upward when a stem upper end extends above the staff and a stem lower end does not extends below the staff, while judging the stem to be downward when the stem lower end extends below the staff and the stem upper end does not extend above the staff, wherein, after the judgment, the coupling function couples a first head and the stem candidate.

However, if the foregoing arrangement for judging the stem orientation is carried out when the foregoing recognition process for the head dividing the stem and the coupling process for these stem and head are carried out, it is not possible to recognize the structure wherein the downward stem is coupled to the shared head shown in FIG. 12 (since the stem is judged to be upward when the stem upper end extends above the staff and the stem lower end does not extend below the staff). Accordingly, in this structure, after the foregoing process for the head dividing the stem is performed, normalization of the stem orientation is executed. Specifically, upon recognizing the drum note including the note having the head dividing the stem, the coupling process for the first head and the stem candidate of the drum note is carried out. With respect to the drum note having the head dividing the stem, the drum notes with the oppositely oriented stems sharing the head are recognized, then the note with the downward stem is deleted, and then the stem candidate obtained by coupling the upper and lower stems is coupled to the remaining first head. With respect to the other drum note, the stem is judged to be upward when the stem upper end extends above the staff and the stem lower end does not extend below the staff, while the stem is judged to be downward when the stem lower end extends below the staff and the stem upper end does not extend above the staff, so as to couple the stem candidate and the remaining head, and the stem not satisfying these conditions is restored to the original stem candidate (stem orientation normalization process) and then the stem candidate and the remaining head are coupled to each other.

The foregoing structure is applicable to a computer-readable recording medium storing a music score reading program of claim 36. The structure thereof is such that, upon recognizing the drum note including the note having the head dividing the stem, the coupling function performs a coupling process for a first head and the stem candidate of the drum note and, with respect to the drum note having the head dividing the stem, the recognizing function recognizes the drum notes with the oppositely oriented stems sharing the head, then the downward note deleting function deletes the note with the downward stem, and then the stem candidate obtained by coupling the upper and lower stems by the stem coupling function is coupled to the remaining first head by the coupling function and, with respect to the other drum note, the stem orientation judging function judges the stem to be upward when a stem upper end extends above the staff and a stem lower end does not extend below the staff, while judging the stem to be downward when the stem lower end extends below the staff and the stem upper end does not extend above the staff, so as to couple the stem candidate and the remaining head by the coupling function, wherein a program is further included for executing a stem candidate restoring function of restoring the stem not satisfiying these conditions to the original stem candidate, and wherein, after restoration to the original stem candidate, the coupling function couples the stem candidate and the remaining head to each other.

BRIEF DESCRIPTION OF THE DRAWINGS

FIG. 9 is an explanatory diagram showing an example wherein a stem is divided by a head, FIG. 10 is an explanatory diagram showing an example of a note recognition process for a head dividing a stem, FIG. 14 is a flowchart showing the main process of a CPU, FIG. 15 is an explanatory diagram showing recognition object heads, FIG. 16 is an explanatory diagram showing a note specifying method of writing a recognition result when a particular sign exists in the recognition result, FIG. 17 is an explanatory diagram showing a drum score standard pattern, FIG. 18 is an explanatory diagram showing a state of a bracket with range designation or without range designation, FIG. 25 is an explanatory diagram showing an actual example of the matching process including the label coupling process, FIG. 28 is an explanatory diagram showing a state wherein hi-hat open of the next paragraph enters a recognition rectangle, FIG. 29 is an explanatory diagram of a paragraph on a music score, and FIG. 30 is an explanatory diagram showing black and white heads, stems and a flag of recognition object notes.

DETAILED DESCRIPTION

Carrying-Out Mode 1

Figure 13:
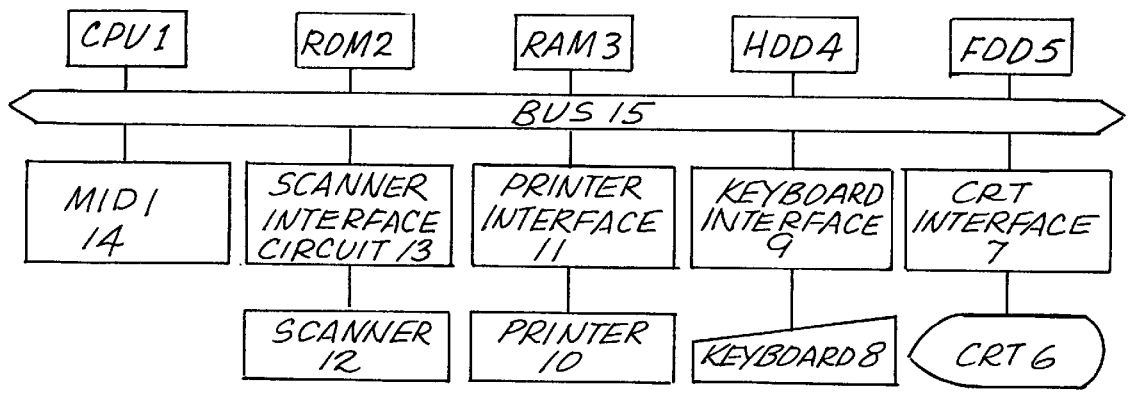
FIG. 13 is a block diagram showing an embodiment structure of a music score reading system which is operated by reading into an external storage device a computer-readable recording medium storing a music score reading program according to the present invention.

Hereinbelow, one carrying-out mode of the present invention will be described based on the accompanying drawings. FIG. 13 is a block diagram showing an embodiment structure of a music score reading system which is operated by reading into an external storage device such as a later-described flexible disk drive FDD 5 (or a CD-ROM drive or the like) a computer-readable recording medium storing a music score reading program according to the present invention. The system is in the form of a computer such as a personal computer, added with a scanner and a MIDI interface circuit. A CPU 1 is a central processing unit for controlling the whole music score reading system based on programs stored in a ROM 2 or RAM 3. Further, a timer circuit is included for executing an interrupt to the CPU 1 per given preset period. Other than as a program area, the RAM 3 is also used as an image data buffer, a work area, etc. A hard disk drive HDD 4 and the flexible disk drive FDD 5 store programs, image data, playing data, etc. Under the control of the CPU 1, a CRT 6 displays image data outputted from a CRT interface circuit 7. Data inputted via a keyboard 8 is transferred into the CPU 1 via a keyboard interface circuit 9. Under the control of the CPU 1, a printer 10 prints print data outputted from a printer interface circuit 11.

A scanner 12 optically scans, for example, a (printed) music score and converts it into two-valued image data, gray-scale image data or color image data, and can be of a desired type, such as a flat-bed type, a handy type or a feeder type. Image data captured by the scanner 12 is inputted into the RAM 3 or the HDD 4 via a scanner interface circuit 13. A MIDI interface circuit 14 is a circuit for carrying out transmission/reception of MIDI data relative to an external MIDI device such as a tone generator module. A bus 15 connects the respective circuits in this music score reading system for allowing them to exchange various data, programs, addresses, etc. In addition thereto, a pointing device such as a mouse, a serial interface circuit such as an RS232C, or the like may be provided.

FIG. 14 is a flowchart showing the main process of the CPU 1. At step S1, an image of a music score is inputted into the RAM 3 by the scanner 12. The image is inputted as two-valued image data. At step S2, an image quality smoothing process such as graphics merger is carried out for reducing blurring, dot noise, etc. At step S3, data on resolution and density are obtained and, for obtaining reference data for staff detection at a later stage, a later-described image quality check process is carried out. In the music score recognition process, if the resolution and the density deviate from given ranges, the recognition rate is lowered. Thus, step S3 checks whether or not these values are within the given ranges. At step S4, it is Judged based on the check results at step S3 whether or not the image quality is OK. If not OK, the routine returns to step S1 where inputting is again carried out by changing the resolution and the density. At step S5, the later-described staff recognition is executed. In the staff recognition process, a staff scan start position detecting process and a staff shift amount detecting process are carried out. At step S6, a paragraph recognition process is carried out. This process is roughly divided into a paragraph recognition process and a brace recognition process. In the paragraph recognition process, the staffs are detected over the whole image, then a set of the staffs with their left ends located at approximately the same places are searched, then it is checked whether the ends of the staffs are mutually connected by black pixels so as to recognize a paragraph. At step S7, the paragraph recognition result is displayed to cause a user to check whether the paragraph recognition result is correct, so that it is judged to be OK or not OK. If not OK, the routine goes to step S8 where the paragraph recognition result is corrected. If the staff recognition fails, the subsequent process can not be carried out. Thus, it is necessary to capture the image again by changing the resolution and the density. Therefore, it may also be arranged that at step S7, the staff recognition result is first displayed so as to cause the user to judge whether it is correct or not and, if not correct, the routine returns to step S1 to capture the image again, while, if the staffs are correctly recognized, the paragraph recognition result is displayed to cause the user to check it.

At step S9, the user is caused to select a drum part in each of the paragraphs. Then at step S11, the normal parts are subjected to the normal music score recognition while the drum parts are subjected to recognition for the drum score. After the recognition of signs is finished over all the pages, steps S11 to S13 scan twice (loop twice) the drum parts in one musical composition so as to estimate a drum notation and allocate musical instruments according to the drum notation with respect to the drum parts over the whole musical composition. In this structure, a correction interface for the drum notation estimate result is not provided. This is because if the recognition result is wrong, it is dealt with by correcting the recognized score signs. Finally at step S14, it is converted into a playable music score data format designating tone lengths and pitches relative to the allocated tone generating musical instruments.

Hereinbelow, steps S9 to S14 will be described in detail. After the staff recognition and the paragraph recognition, step S9 causes the user to set the drum parts simultaneously upon checking the paragraph recognition or upon correcting the paragraph recognition result. This means that the setting is achieved by displaying the results of the recognized staffs and paragraphs to cause the user to check the staffs being the drum score. Herein, a flag for checking whether the drum score or not is set as part information of data holding the paragraph recognition result.

Based on the set flag information, a recognizing section distinguishes between the normal music score recognition and the drum score recognition. Then, step S10 executes the sign recognition with respect to the drum score. The normal music score recognition and the drum score recognition differ from each other as follows: In the drum score recognition, recognition of a sign which does not exist in a drum score is skipped (however, as a measure to wrong setting, wrong recognition, wrong displaying or the like, it may be that the recognition itself is performed and only the output is limited). In the drum score recognition, recognition of signs and character strings peculiar to a drum score is added while recognition of character strings unnecessary in a drum score is deleted. Further, recognition of drum heads other than a black head and a white head is added. On the other hand, threshold values are changed according to the appearing probability/appearing manner of signs of a drum score (for example, since the appearing probability of slur is low, recognition can be speeded up by setting a threshold value to be strict, or the like). Similarly, recognition threshold values of normal notes are changed (black head chords are small in number, the appearing rate of white heads is small, or the like; therefore, a threshold value of a black head may be set to be strict or, as the case may be, white heads may not be recognized; in this structure, white heads are not recognized).

Among them, the recognition of the drum heads is carried out as follows: Among the heads of the drum score, the black head which is the same as the normal music score is recognized, like the normal music score, by the thick/thin separation process carried out by eliminating lines of the staffs and the ellipse detection process for recognizing the black head portion. In this structure, as described before, since the appearing probability of the white heads in the drum score is low, the recognition thereof is not performed. On the other hand, the heads of the drum score other than those are described by thin lines, such as (X, ◊), and there exist various other types. Accordingly, like hitherto, they can not be detected by the thick/thin separation process and the ellipse detection process. Therefore, like normal signs (for example, rests etc.), whole notes are each recognized by matching a detected label (rectangle set in a proper size for recognizing an object sign) with a dictionary. Recognition of each of the other heads is realized by separating a label using a stem candidate (presumed to be a stem) and by matching with a dictionary while coupling labels around the stem candidate. This recognition of the drum heads will be described in detail in a column of a later-described carrying-out mode 7. The recognition object heads will be those as shown in FIG. 15. Although there exist drum heads other than those, general drum scores can be essentially dealt with by defining them to that extent. It is also effective to change kinds of the recognition object heads depending on which position of the staff (pitch) a head is located in [for example, a head (R) exists only in the third space, or the like; such recognition is not carried out in this structure]. With respect to those heads other than the black head (white head), the kinds of the recognized heads are kept in sign holding data. Specifically, the head kinds are written into a holding area drumNote in the recognized sign holding data.

Upon recognizing a drum score, recognition of signs relating to drum notes is also important. For example, with respect to hi-hat cymbals, open, close, (further, half open), etc. may be expressed by writing (°), (+), etc. above notes. Further, there is also a notation wherein a note with an accent (>) represents a cymbal (crash), and the others represent hi-hat cymbals. Accordingly, it is necessary to detect association with them. Therefore, in case of the drum score, (°) and (+) are additionally recognized upon sign recognition. If ($^{602}$), (+) or (>) exists in the recognition results, a value corresponding to the sign kind is written on a note whose head center C or stem end point D exists in a rectangle B obtained by adding a proper width around such a sign, as shown in FIG. 16. In case of the normal drum score, the notes to be affected by association with these signs are only those written at the highest pitch, and further, the accent sign representing a crash cymbal and the hi-hat sign do not overlap with each other. The notes to be associated with them are limited to those notes having (X) heads. Therefore, it may be considered to delete a storage area by setting the notes to be associated with them to be those at the highest pitch and by setting the hi-hat and the accent to be flags at the same position. However, in consideration of a possibility of wrong recognition and simplification of the process, separate flags may be written on all the notes located at the same band. In this structure, values corresponding to signs are written on all the notes, other than the black heads, at the same band. In this case, however, it is necessary to consider preference order for detecting the association. Specifically, if there is association with hi-hat open, close or the like, it is not necessary to consider association with an accent. Accordingly, the detection is carried out in order of detection of association with the hi-hat sign and then detection of the accent sign. It is arranged that association can not be overwritten onto a note whose association has been once detected. In a later-described standard pattern, hi-hat half open, hi-hat quarter open or the like is not dealt with. However, sign recognition and association recognition may be carried out so as to change hi-hat half open, hi-hat quarter open or the like to hi-hat open. The hi-hat open, close or the like (the value is stored in a space area of drumNote) is preferentially written as compared with the accent.

After the sign recognition has been finished as described above, estimation of a drum notation is carried out at steps S11 and S12. In this structure, a corresponding notation is estimated through an operation called an application, then the result of the recognition thereof is displayed, and then data is prepared in a format of the drum score standard pattern for playing. The foregoing application is realized by scanning twice the drum parts in one musical composition. According to the application result, flags representing actual musical instruments are further written into drumNote. Referring to these flags, the data is prepared in the format of the drum score standard pattern. Prior to describing the foregoing application process, the drum notation and the drum score standard pattern will be described hereinbelow.

There are various kinds of drum score notations. Among them, there are very special notations whose frequency, however, is low so that they are not aimed at. What are the most problematic in the drum notations are the notations of cymbals (hi-hat cymbals, crash cymbal, top cymbal, etc.). In case of the other musical instruments, only the pitches change to a degree. In case of toms, the number thereof (the number of pitches) changes (in case of two, three or four). The cymbal notations are roughly divided into two types, i.e. the case of expressing with one pitch, and the case of dividing hi-hat and others into two (or more) pitches. Further, each of the types is divided into the case of expressing the kinds of musical instruments by changing them to the kinds of heads, and the case of expressing depending on whether there exists an accent or not. For expressing a half note or a whole note, another head may further be used. There are also a case wherein the kind of a musical instrument is designated by a character string, a case wherein musical instruments are designated by character strings at the beginning of the musical composition, a case wherein area grouping is carried out by character strings, and a case designation by character strings is carried out with respect to all the notes.

As described above, in the music score reading system of this structure, there is the drum score standard pattern for displaying the recognized results and for playing as shown in FIG. 17. Corresponding musical instruments are a crash cymbal (it may also be called a side cymbal), a top cymbal (it may also be called a ride cymbal), hi-hat open, hi-hat close, a snare drum, rim shot, a High tom, a Mid tom, a Low tom, a bass drum and a pedal hi-hat. The sign recognition results should be applied to this standard pattern. Further, there is also a case wherein musical instruments (cowbell, chime, gong, etc.) other than those corresponding to the standard pattern are notated. Also in this case, a proper application is necessary.

The application procedure for the drum instruments other than the cymbals will be described below.

It is OK to determine that the snare drum and the rim shot are notated in the third space of the staff. The snare drum is normally expressed by a black head, while the rim shot may be expressed by another head such as (R), or by a black head with designation of the rim shot by a character string. Accordingly, the black head in the third space is set to be the snare drum, while the head other than the black head is set to be the rim shot, during the first loop at step S1 of the twice scanning. If there exists the head other than the black head, a logical value rimOtherExist is set to be true. The character string representing the rim shot is searched and, if it exists, a logical value rimStrExist is set to be true. During the second loop at step S13, if the logical value rimStrExist is true while rimOtherExist is false, all the notes in the third space are set to be the rim shot.

Normally, the pedal hi-hat is notated in the lower first space as a head (X). However, it may be shifted to a lower side for avoiding the bass drum. Thus, in consideration of a possibility of wrong recognition, the note, other than the black head, below the first line is set to be the pedal hi-hat. The pedal hi-hat can be set through the first loop.

Normally, the bass drum and the tom are each notated by the black head, wherein the bass drum is notated in the first space and the tom is notated at the 1–4 pitch from the second line to the fifth line excluding the third line. However, there also exists a notation wherein the bass drum is notated in the lower first space. In this case, a possibility is high that the Low tom is notated in the first space (that is, at the same pitch as the normal bass drum). Like this, the range of the tom changes depending on the pitch of the bass drum. Therefore, the pitches, including the pitch of the bass drum, where the black heads exist are detected during the first loop. In this structure, however, the pitches lower than the lower first space are deleted as wrong recognition. Accordingly, during the first loop at step S11, two steps, i.e. the lowermost step (minTom) and the step one-up therefrom (minTom2nd), and the highest pitch (maxtom) of the pitches where the black heads exist are detected, and the black head notes whose pitches are lower than the lower first space are deleted. At this time, although there is normally no problem by setting the highest pitch of the tom up to the fifth line, the detection range is expanded to the upper second space in this structure in consideration of possibility of wrong recognition and special notation. From the foregoing information, the pitches of the bass drum and the toms are detected in the following manner. Specifically, if minTom is lower than the first space, the pitch of the bass drum (heightBassDrum) is minTom, and the pitch of the Low tom (heightLoTom) is minTom2nd. Otherwise, the pitch of the bass drum is in the first space. In this case, if minTom is in the first space, the pitch of the Low tom is minTom2nd, otherwise, the pitch of the Low tom is minTom. Further, the pitch of the High tom (heightHiTom) is maxtom. During the next second loop at step S13, the actual setting (fixed) of the bass drum and the toms are carried out. Specifically, in case of the black head whose pitch is heightBassDrum, the bass drum is allocated, in case of the black head whose pitch is heightLoTom, the Low tom is allocated, in case of the black head whose pitch is heightHitom, the High tom is allocated, and in case of the black head whose pitch is between heightLoTom and heightHiTom and in other than the third space, the Mid tom is allocated. The standard pattern deals with three kinds of toms. Thus, in case of four or more toms, intermediate toms are allocated to one kind.

The application procedure for the drum instruments of the cymbals will be described hereinbelow. As described above, since there are various kinds of drum instrument notations of the cymbals, the application can not be achieved only through one loop. Accordingly, the application is determined by scanning twice (looping twice) the recognition results of the drum parts of all the paragraphs over all the pages. In the first loop, information about the number of the heads of each kind at the respective pitches in the range corresponding to the cymbals is obtained. Prior to the second loop, a conversion table for a drum notation application based on drum application conditions is set from the obtained information. In the second loop, the musical instruments which actually sound the respective notes are set using the conversion table.

In the process of the application to the drum score standard pattern, proper estimation is executed using conditions which can be a basis, obtained from various notations. The basic conditions are as follows: In light of musical instrument characteristics, the probability is high that a half note or a whole note represents the crash cymbal. Thus, in this structure, a half note or a whole note is considered to be the crash cymbal so as to enable the estimation of the notation. Further, on the drum score history, the probability is high that the head ($\diamond$) is notated as a half note or a whole note. Thus, by preferentially allocating the head ($\diamond$) to a half note or a whole note, the estimation of the notation can be more adequate. When a whole note exists, the probability is high that a half note is notated by the same head as that of the whole note. The probability is low that the notation of the drum notes of the cymbals uses three or more pitches. When notated using two pitches, the lower side represents the hi-hat, while the upper side represents the crash cymbal or the top cymbal. If the crash cymbal and the top cymbal are both notated in the upper side, the top cymbal is represented by the head (X) while the crash cymbal is represented by other than that (changing the head or the like). Further, if there is only one kind of a cymbal (other than the hi-hat cymbals), it is the crash cymbal. The note whose head is (O) represents hi-hat open, while the hi-hat not associated with the sign (°) [or associated with the sign (⁺)] represents hi-hat close.

Hereinbelow, the estimation process of the drum instruments of the cymbals according to the process of the application to the drum score standard pattern will be described in detail.

The following information is obtained during the first loop at step S11.

i) the number of the heads of each kind at the respective pitches;

ii) whether there exists a note shorter than an eighth note among the heads of each kind at the respective pitches;

iii) the rate of the heads with accents among the heads of each kind at the respective pitches;

iv) setting of a logical value representing whether a note with the head ($\diamond$) exists.

A process of setting the note with the head (O) to hi-hat open, or a process of replacing the head ($\Delta$) or (C) with the top cymbal is executed herein.

In the first loop at step S11, the number of the heads of each kind at the respective pitches was derived. Then, in the second loop pretreatment at step S12, this information table is scanned from the lower pitch so as to derive the actual cymbal pitches. The pitch first found is set to be the first pitch, the subsequently found pitch is set to be the second pitch, and the subsequent pitches are normalized to the second pitch. However, if the number of the notes at the first pitch is extremely small, a possibility of wrong recognition of the notes is high. Accordingly, those notes may be deleted to shift the detection results of the cymbal pitches. This process is particularly effective when there are three or more cymbal pitches.

Then, a drum application conversion table is prepared. In the conversion table, with respect to elements classified depending on the states, at two pitches, relating to kinds of heads and association with accents etc., it is possible to write kinds of musical instruments to be allocated when notes are in the corresponding states.

The classification of the note states may be CT_PEKE_NUN [head (X) with no association], CT_PEKE_CLS [head (X) associated with (⁺)] and so on. On the other hand, the kinds of musical instrument allocation may be DN_HHCLOSE (hi-hat close), DN_SIDEHALF (half note of crash cymbal) and so on. The notations are classified into types according to the number of the pitches of the detected cymbals and so on, and the musical instruments are allocated onto the conversion table depending on the type. The type classification is, for example, as shown in Table 1 below.

TABLE 1

| | |
|---|---|
| type 1 | one pitch, and there exist no kinds other than heads (X) |
| type 2 | one pitch, there exist heads of one kind in additlon to heads (X), and the heads other than heads (X) are each longer than quarter note |
| : | (omitted) |

TABLE 1-continued

| | |
|---|---|
| type 23 | two pitches, there exist heads (X) at the upper pitch and heads of two other kinds, and both other than heads (X) are each longer than quarter note |
| : | (omitted hereinbelow) |

The musical instrument allocation to the conversion table is carried out based on the foregoing basic conditions so as to apply the most adequate ones.

Specifically, in type 1, it is adequate to set to all hi-hat. Naturally, based on the basic conditions, hi-hat close is normally set and, if associated with (°), hi-hat open is set.

In type 2, it is adequate that the heads other than the heads (X) are set to be half notes (whole notes) of the crash cymbal. In this case, the heads (X) with accents are allocated the crash cymbal. CT_PEKE_ACC [head (X) associated with accent] of the conversion table is set to DN_SIDE (crash cymbal), and the conversion table other than the heads (X) is set to DN_SIDEHALF (half or whole note of crash cymbal).

In type 23, all the lower side is allocated the hi-hat cymbals, while the upper side will be as follows:

The heads (X) are allocated the top cymbal.

If a whole note exists and the same head as the whole note exists with respect to a note other than the whole note, the whole note is set to a whole note of the crash cymbal, the note with the same head as the whole note is set to a half note of the crash cymbal, and the head (another) different from the whole note is allocated the crash cymbal.

If a whole note exists but the same head as the whole note does not exist with respect to a note other than the whole note, or if a whole note does not exist, when the head (◊) exists, the head (◊) is set to a half note of the crash cymbal and another head is set to a quarter note of the crash cymbal and, when the head (◊) does not exist, the heads with less number are each set to a half note of the crash cymbal and another head is set to a quarter note of the crash cymbal.

If a whole note does not exist but the head (◊) exists, the head (◊) is set to a half note of the crash cymbal and another head is set to a quarter note of the crash cymbal.

The probability of the foregoing notation is the highest. However, it is possible that, for example, in type 2, the heads other than the heads (X) may be quarter notes of the crash cymbal and the heads (X) with accents may be the hi-hat.

After the second loop pretreatment has been finished, the allocation of the musical instruments is performed in the second loop at step S13. Specifically, while scanning the recognition results, the musical instruments on the conversion table are allocated corresponding to the respective heads at the respective pitches and the association with the signs. When a value of the conversion table designates a half note such as DN_SIDEHALF, if originally recognized as a quarter note before the estimation, the note ID is converted to a half note. On the other hand, if designation of deletion (DN_MATCHINGNONE) exists on the conversion table, the recognized sign is deleted (ID=ID_DELETED).

During the foregoing scanning, designation of the musical instruments based on character strings is recognized to allocate the musical instruments on the conversion table. However, the character strings of the cymbals are similar to each other, such as "ride cym", "side cym", "t.c." and "c.c.", so that a possibility of wrong recognition is high. Thus, it is dangerous to store all the character strings notated in the drum score into a dictionary so as to reflect all the recognition results. Therefore, it is adequate to limit the character strings in the dictionary only to those with low probability of wrong recognition and also limit the effects of the character strings. In this structure, the character string is limited only to "top", and the effects are limited only to two cases, i.e. the case wherein when the crash cymbal is designated without a half or whole note, the top cymbal is allocated while the crash cymbal is normally allocated, and the case wherein when the hi-hat cymbals are designated without association with (°) or (+), the top cymbal is allocated while the hi-hat cymbals are normally allocated. In case of corresponding to both cases, either of them with higher probability of notation is selected.

In addition, the head (Δ) and the head (C) can be recognized. They normally represent cowbell or cup and do not exist in the standard pattern. Accordingly, it may be considered to designate deletion on the conversion table during the application process to delete it. Also in case the percussion such as a tambourine is notated on the drum score, if there is no corresponding notation in the application process, such as the head (X) on the third line, it is deleted from data unless a particular process is executed. However, if such a note is simply deleted, it is possible that rhythm is not established. Accordingly, it may be replaced with the top cymbal or the like. Similarly, if a note is simply deleted, it is possible that rhythm is not established, and thus, it may be considered to replace it with a rest of the same tone length, instead of the deletion.

After the musical instruments have been allocated as described above, step S14 converts into a playable and/or displayable music score data format based on the pitches and tone lengths of the notes on the drum score which have been clear from the foregoing music score recognition.

By recognizing the notation of the drum score as described above, the drum score can be recognized to be played without burdening the user. Further, even the user having no knowledge about the drum score can use it.

Other than the foregoing carrying-out mode structure, the following other carrying-out mode structures can be considered.

Carrying-Out Mode 2

If the standard pattern is provided with respect to pasting of the notes and other signs onto the drum score so that pasting other than that in the standard pattern format can not be carried out, it is necessary to paste them according to the notation different from those of commercial music scores, and correction of the recognition results can not be done based on the original music score. If an interface which enables any notation according to the music score is provided so that the notation is estimated according to the foregoing application algorithm upon playing so as to specify musical instruments to play, the correction of the recognition results can be achieved by realizing the same state as that of the original music score.

Carrying-Out Mode 3

This structure deals with a notation wherein the tone color (drum instruments) is changed during a musical composition according to character strings. What becomes a particular problem in such notation is a change between the snare drum and the rim shot, a change between the crash cymbal and the top cymbal and a change between the hi-hat and the top cymbal.

The processes are classified into two kinds, i.e. a case of the snare drum/rim shot and the other cases (cymbals). In the respective cases, it is judged whether the tone color change during a musical composition according to character strings is actually carried out. Further, in case of the cymbals, which of the changes should be judged. In this carrying-out mode, for realizing reflection of the character strings in time sequence, the snare drum, the crash cymbal, the hi-hat cymbals, etc. are added as the character strings to be recognized, in addition to the rim shot and the top cymbal. Further, means for recognizing range designation, such as a bracket, accompanying the character string is added. In this case, a hot spot being a reference of time sequence alignment to be performed later is set to be a start point (left end) of a bracket. The range designation by the bracket is separately recognized with respect to a case having an end as shown at (a) in FIG. 18 and a case having no end as shown at (b) in the same figure. In case of a character string having an end, another sign data having character string end ID for setting a right end of a bracket to be a hot spot is added so as to use it as a reference upon time sequence scanning. Further, in consideration of a case wherein an end of range designation of a character string by a bracket is separately indicated, an end bracket as shown at (c) in FIG. 18 is also recognized. In this case, a reference hot spot of time sequence alignment is set to be a right end of the bracket. Further, in case of a character string without range designation, it is possible that it may be shifted rearward (right) relative to a note. Therefore, it may be considered to shift a hot spot slightly forward (left) in time sequence.

The results thus recognized are aligned in time sequence.

The process for the snare drum/rim shot tone color change is carried out in the following manner. First, the recognition results are scanned from the head in time sequence. An initial value of tone color holding data snareOrRim is set to DN_SNARE. If a black head exists in the third space, the value of snareOrRim is written into drumNote. If a character string representing the snare drum or a character string representing the rim shot exists, DN_SNARE or DN_RIM is written into snareOrRim. If an end ID is detected, the current value of snareOrRim is rewritten to an inverse value. If a repeat bar line end or the like exists, snareOrRim may be changed. On the other hand, it may be considered to change the process between a case wherein only one of the character string representing the snare drum and the character string representing the rim shot exists with respect to tone color designation at a position other than a start position in the third space and a case wherein both strings exist alternately. Specifically, when both strings exist, it is not necessary to consider the end.

The process for the cymbal tone color change is carried out in the following manner. In case of the top cymbal, the crash cymbal and the hi-hat, there are a case wherein the crash cymbal and the top cymbal are switched therebetween and a case wherein the hi-hat cymbals and the top cymbal are switched therebetween. Accordingly, simultaneously with judging whether the instrument changes by the character strings are carried out, which of the instrument changes should be judged.

The following process is additionally performed after the step of allocating the musical instruments onto the conversion table (see the description following Table 1) according to the type (for example, type 23 shown in Table 1) upon estimating the notation (however, the process of the character string representing the top cymbal is not performed). The results of this process are set to be "first estimation results".

First, in case of two cymbal pitches, there is no possibility of switching between the hi-hat and the top cymbal. Further, if both the crash cymbal and the top cymbal already exist in the first estimation results, the instrument switching by the character string is not carried out. Also in case of one cymbal pitch, when both the crash cymbal and the top cymbal exist in the first estimation results, switching between the hi-hat cymbals and the top cymbal can be estimated. Otherwise, recognition result scanning in time sequence is carried out once so as to count the number of the hi-hat cymbal notes and the number of the crash cymbal notes of the first estimation results in a region designated by the character string representing the top cymbal. If the hi-hat cymbal notes are greater in number, it is judged to be switching between the hi-hat cymbals and the top cymbal and, otherwise, it is judged to be switching between the crash cymbal and the top cymbal. In this judgment, considering that the hi-hat cymbal notes are basically greater in number than the crash cymbal notes, it may be arranged to judge not based on the numbers of the hi-hat cymbal notes and the crash cymbal notes, but based on the rate of the crash cymbal notes relative to the total number using a threshold value.

After the switching mode is determined, the time sequence scanning is performed once again to change the musical instrument like in the process for the snare drum and the rim shot. In case of switching between the hi-hat cymbals and the top cymbal, what was judged to be the hi-hat cymbals in the first estimation results is switched to the top cymbal. In case of switching between the crash cymbal and the top cymbal, what was judged to be the crash cymbal in the first estimation results is switched to the top cymbal.

Carrying-Out Mode 4

The designation of the drum part is not carrieout by the user. Whether or not the drum part is automatically recognized. In music scores, it is usual to indicate a part name by a character string on the left of the staff. Therefore, by recognizing the character string, the drum part can be automatically recognized. On the other hand, it may be arranged to recognize the drum heads other than black and white heads in the note recognition and, after the recognition, recognize the drum part according to the number of the drum heads. In this case, in consideration of a possibility of wrong recognition and of a case wherein beating time with the hand or the like is normally notated using the heads (X) in the music scores, a threshold value is set with respect to the number of the drum heads. If it is arranged to cause the user to designate whether the drum part exists, the process which becomes useless when the drum score does not exist, such as the recognition of the character string on the left of the staff or the recognition of the drum heads in the normal music score, and a possibility of wrong recognition can be avoided. Further, if the existence of the drum part is designated, the lowermost part of a paragraph can be simply designated as the drum score.

Carrying-Out Mode 5

Allocation of the crash cymbal and the top cymbal is changed depending on the tempo of a musical composition. If the tempo of the musical composition is slow, the music tonality is usually calm. In such a case, it is common to use the top cymbal in a state where the crash cymbal is normally used, and to carry out playing with soft accent. However, this is not usually indicated by character strings or the like. Therefore, such a state is estimated from the tempo. Specifically, if the temp is slower than a given value and further the top cymbal is not allocated in the instrument allocation of the notation, the top cymbal is allocated instead of the crash cymbal. The tempo can be determined by recognition of tempo signs.

Carrying-Out Mode 6

Higher recognition rate of character strings, particularly higher accuracy of recognition of specialized character strings in the drum score recognition is aimed at in one embodiment. For example, the meanings of "ride cym" and "side cym" largely differ from each other with only one different character. Accordingly, there is a problem in such a process, wherein, for example, if "ide cym" is recognized, i.e. seven characters in eight characters are matched, the recognition of a character string is judged to be successful so that one of the character strings whose description order in a dictionary is earlier is selected. Thus, the position of a character to be noted in a character string is stored in the dictionary. Then, if recognition of the character in the foregoing character position fails, a process is carried out so as not to reflect it in the character string recognition results, and a character whose matching degree is the highest among characters having possibilities of being present in that position is detected so as to enhance the accuracy (for example, the matching degrees of r and s are compared and, if s is higher, "side cym" is determined).

Carrying-Out Mode 7

As described above, in the drum head recognition in the foregoing carrying-out mode 1, the black head which is the same as the normal music score is recognized, like the normal music score, by the thick/thin separation process carried out by eliminating lines of the staffs and the ellipse detection process for recognizing the black head portion and, since the appearing probability of the white heads in the drum score is low, the recognition thereof is not performed. On the other hand, the heads of the drum score other than the black head and the white head are described by thin lines, such as (X, ◇), and there exist various other types. Accordingly, they can not be detected by the thick/thin separation process and the ellipse detection process like the detection of the black head. Therefore, recognition thereof is carried out by eliminating a stem to separate a head label (rectangle set for recognizing an object sign), and scanning a stem candidate (presumed to be a stem) so as to match a detected label around the stem candidate with the dictionary. Since it is possible that the head is divided into a plurality of labels due to the stem elimination, if the matching fails, scanning of a stem candidate is further continued so that a process of coupling between a next detected head label and the foregoing separated label is carried out, and then matching with the dictionary is again executed. Other than this, there exist unique things in the drum score recognition and the coupling process, which will be described later. Since black head chords (in case of black heads abutting) in the drum score are small in number, the head can also be detected through the matching according to the foregoing label separation, not through the foregoing ellipse detection process. As described before, the recognition object heads are as shown in FIG. 15.

Hereinbelow, details of the music score recognition method with respect to the drum score in the structure of the present music score recognition system will be described. As a premise of the recognition, a music score image captured by the scanner 12 is obtained in the form of 1 dot/1 byte, and 1 bit thereof is set to a plane of the original image (bitSrc).

(1) Detection Method of Normal Note (other than White Head)

The detection of the normal note excluding the white head (detection of black head) is carried out in the following procedure.

<1> Thick/Thin Separation Process

The plane (bitSrc) of the original image is copied as two other bit planes (bitTic, bitdrm) for the normal notes and the drum notes. In the copied two bit planes, a staff elimination process is performed. On the other hand, the staff elimination in the plane (bitSrc) of the original image is not carried out. The music score image is scanned in the transverse direction so as to eliminate short runs from one (bitTic) of the copied bit planes. Scanning is also carried out in the longitudinal direction to eliminate short runs. The remaining part is composed of thick constituent elements (black heads, linked flags, etc.) on the music score.

<2> Stem Detection

Using bits of the short runs eliminated through the transverse direction scanning, thin lines in the longitudinal direction are detected.

<3> Head Detection

While scanning regions around the foregoing longitudinal thin lines (hereinafter referred to as stem candidates), if a thick portion exists, the boundary line of this thick portion is detected to input coordinates at given intervals and the equation of ellipse is calculated. If this equation of ellipse represents a shape which is adequate as a head, it is added to ellipse holding data (ep).

<4> Stem Coupling/Recognition

It is judged whether the foregoing stem candidate and ellipse are in an adequate positional relationship as a note. If adequate, a coupling process with the stem is carried out so as to be added to the recognition results as a note.

The recognized black head is eliminated from the copied other bit plane (bitdrm) so as not to be an object of drum head recognition to be executed next. Since small notes are high in possibility of wrong recognition, it is preferable not to recognize them or not to eliminate them.

(2) Drum Note Recognition Basic Process

<1> Head Label Separation

Figure 1:
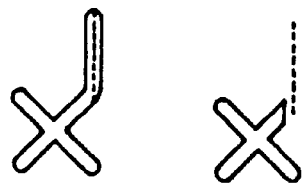
FIG. 1 is an explanatory diagram showing a state of a head label separation process for a drum note.
Figure 2:
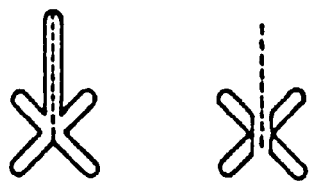
FIG. 2 is an explanatory diagram showing a state wherein a head is divided into a plurality of pieces due to a stem elimination process.

Label bits on the left and right of the stem candidate of the bit plane (bitdrm) for the drum notes are eliminated in a given width as shown in FIG. 1. Then, the drum head label is separated from the stem. However, depending on the state, it is possible that the head label is separated into a plurality of labels as shown in FIG. 2. Therefore, the recognition is carried out while performing the label coupling as will be described later.

<2> Matching

While scanning a region around the stem candidate, the label of the bit plane (bitDrm) is detected. The detected label rectangle is slightly expanded to the left and right so that the plane (bitSrc) within this rectangle is set to be an object of matching. Expanding the rectangle to the left and right slightly is a process for reducing noise of the stem. Specifically, since a distance between the detected label and the stem is so small, in case of the rectangle itself, a portion of the stem may be or may not be added to the recognition object, which largely changes matching with the dictionary. Therefore, the rectangle is expanded so as to add the stem to the recognition object. The reason why bitSrc rather than bitdrm is used as the object bit plane is for preventing the staff eliminated state from affecting the matching.

Then, bitSrc within the rectangle (label) is matched with the dictionary. Any matching manner will be acceptable.

Figure 19:
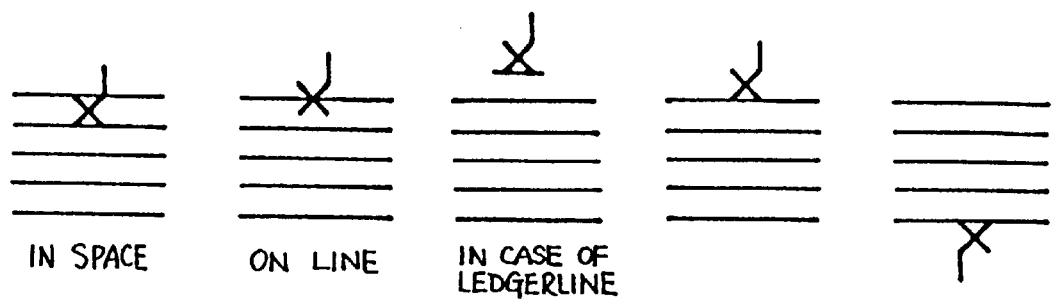
FIG. 19 is an explanatory diagram showing an example wherein heads to be integrated to one head kind intersect with the staff.
Figure 20:
FIG. 20 is an explanatory diagram showing an example wherein heads to be similarly integrated to one head kind intersect with stems.
Figure 21:
FIG. 21 is an explanatory diagram showing manners of labels to be recognized in case of the foregoing intersection.

In the dictionary for matching, a plurality of ID's are provided for each of the head kinds according to combinations of the contacting states of the head, the stem and the staff. After the matching, an ID integrating process is carried out. Specifically, as shown in FIGS. 19 and 20, a plurality of ID's are provided for each head kind, i.e. with respect to a case of the head intersecting with the staff, a case of the head intersecting with the stem, and a case of a combination thereof. At this time, recognition object labels (labels to be matched with the dictionary) will be as shown in FIG. 21. They are matched with the dictionary as the respective ID's and finally integrated to one ID representing the head (X). It may also be arranged to set these patterns as one ID from the beginning. Then, however, the number of the recording patterns per ID becomes enormous. Therefore, as described above, by classifying them based on intersection with the staff/intersection with the stem, the number of the patterns per ID can be reduced so as to facilitate arrangement upon preparation of the dictionary.

Whether to perform the matching or not is judged depending on the size of the rectangle. For example, with respect to a rectangle whose height is clearly smaller than the head, it is not necessary to carry out the matching, thereby shifting to a later-described label coupling process. On the other hand, when the width is large, it is considered that a tie is coupled to the head so that a later-described tie elimination process is carried out. If this process fails so that the rectangle remains large, it is judged that the matching failed from the beginning, and the label coupling process is also reset.

<3> Label Coupling

If matching between the head dictionary and the label is carried out, but fails (ID_MATCHINGNONE), the label continues to be scanned and is coupled to a next detected label for re-recognition (matching again with the dictionary). However, matching is once performed with the second label itself used for the coupling and, if the preference degree of an ID in the matching results is the greatest, it has priority. Then, resetting of the label coupling maximum size (dxt) and resetting of the label coupling (setting to a label coupling enable state) are executed, and a longitudinal distance (dyt) for starting new coupling is also set. Further, if the preference degree of an ID in the recognition results is the greatest, the rectangle coupling is finished at that time point, and the rectangle and distance initializing process (the foregoing two reset processes) is executed for performing new rectangle coupling.

In the matching, it is possible that during the label coupling, prior to becoming a recognition rectangle which includes all the heads to be originally recognized, it may have the same shape as that of another head. Thus, the preference degrees are assigned to the recognition results. In case of the recognition result of the low preference degree, the next label scanning is carried out while holding that ID and that rectangle. If an ID of a higher preference degree is not found, it has priority.

If a recognition object label formed during the label coupling is recognized as an ID different from an intended one, this may be stored in the dictionary as a reject label and, if the recognition result represents it, it can be judged as recognition failure. There are some cases wherein the matching results are special, such as a coupled head in which heads are coupled, and a tremolo sign. If these are recognized, corresponding processes are carried out as will be described later.

If the matching with the dictionary is succeeded, the data is added to the head data (ep).

<4> Stem Coupling/Recognition

Like the black head, a process of coupling with the stem candidate is carried out. However, in case of the drum head, there may be a case wherein a special process is required, which will be described later. With respect to the heads other than the black head (white head), the kinds of the recognized heads are kept in the sign holding data. Specifically, the head kinds are written into the holding area drumNote in the recognized sign holding data.

Figure 22:
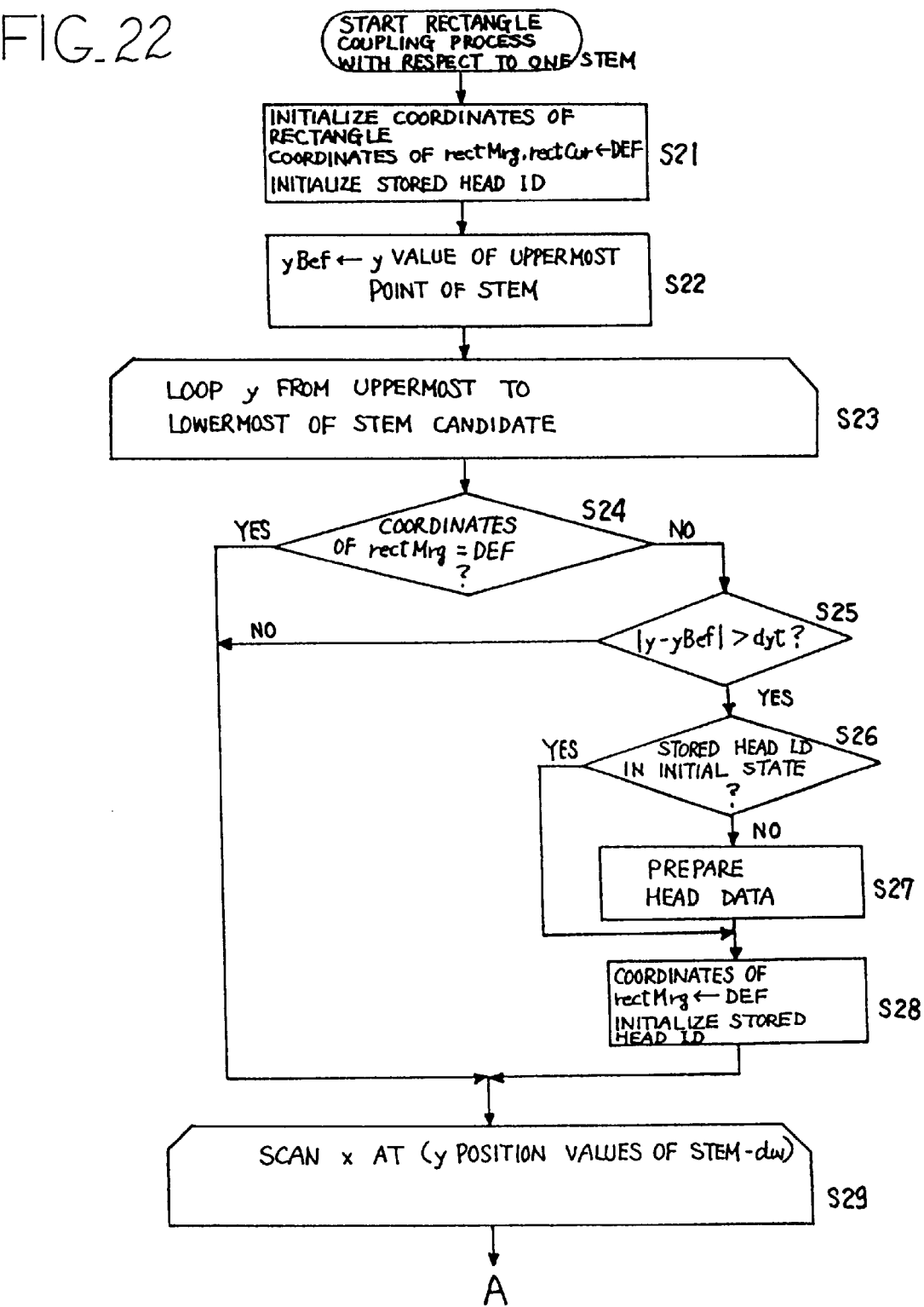
FIG. 22 is a flowchart showing details of a matching process including a label coupling process.
Figure 23:
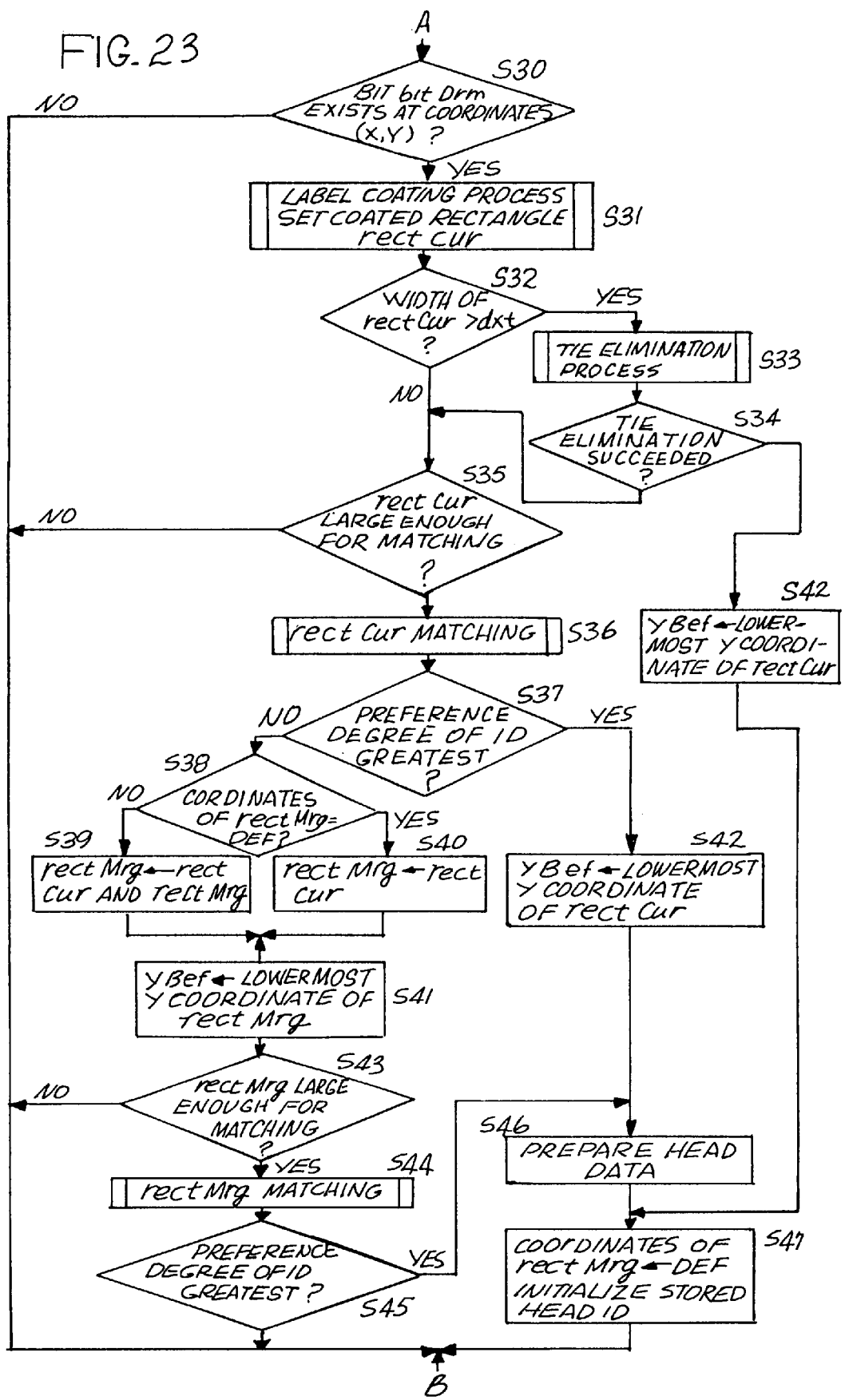
FIG. 23 is a flowchart showing details of the matching process including the label coupling process.
Figure 24:
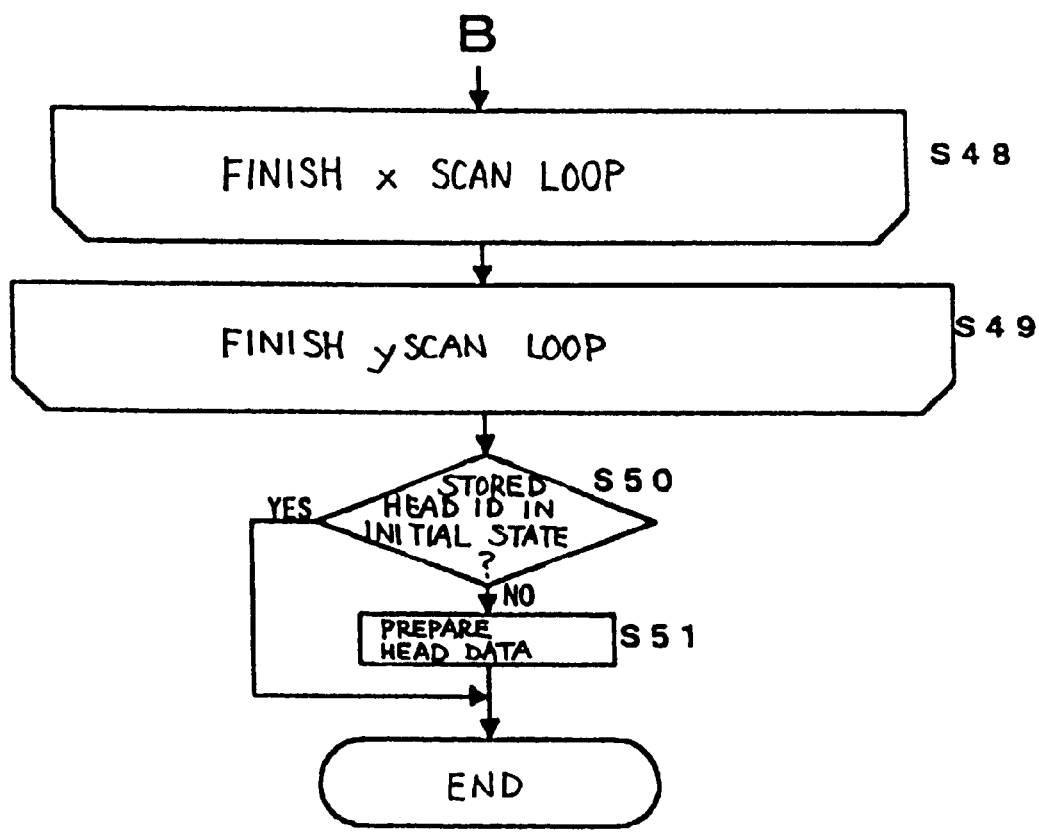
FIG. 24 is a flowchart showing details of the matching process including the label coupling process.

Details of the matching process including the foregoing label coupling process are shown in FIGS. 22 to 24 as a flowchart. In the process of the same figures, bitdrm is searched while scanning the region around the longitudinal line of the stem candidate in a given width dw and, if found, it is multiplied by a coating function so as to detect a rectangle (rectCur: a rectangle surrounding a detected label). As shown at (a) and (b) in FIG. 25, while judging the size of the rectangle, matching is first performed using only rectCur and, depending on the result, it is merged with a prior rectangle so that matching is also carried out using a merged rectangle (rectMrg: a rectangle obtained by coupling labels).

At step S21, coordinates of rectmrg and rectCur are set to default values so as to initialize coordinates of a rectangle, and a stored head ID is also initialized. At step S22, yBef is set to a y value of the uppermost point of a stem. At step S23, y is looped from uppermost to lowermost of a stem candidate. Then at step S24, it is judged whether the coordinates of rectMrg are the default values, respectively. If they are the default values, the routine proceeds to later-described step S29. If they are not the default values, the routine proceeds to step S25. At this time, if a distance with no dots extends to a given degree, resetting is necessary for scanning next one. Therefore, at step S25, it is judged whether an absolute value of a difference between a value of y point being searched and a value of the stem uppermost point exceeds a value of the foregoing dyt. If not exceeding, the routine proceeds to later-described step S29 similarly. On the other hand, if exceeding, step S26 judges whether the stored head ID is in the initial state. If in the initial state, the routine proceeds to later-described step S28. On the other hand, if not in the initial state, head data is prepared using the stored head ID and the rectangle at step S27. At step S28, the coordinates of rectMrg are set to the default values, and the stored head ID is initialized. A series of the processes from S25 to S28 are executed only when the coordinates of rectMrg are not in the initial state (see S24). After the execution of the processes or when S25 Judges that the value is not exceeded, step S29 scans a region around a longitudinal line of the stem candidate in a given width dw. At step S30, it is Judged whether a bit bitdrm exists at coordinates (x, y). If not existing, the routine proceeds to later-described step S48 to finish X-direction scan loop. If the bit exists at S30, step S31 multiplies it by a coating function to detect a second label (rectangle) (rectCur). At step S32, it is judged whether the detected second label rectangle is larger than the foregoing label coupling maximum size (dxt). If judged to be larger, the later-described tie elimination process is carried out at step S33. At step S34, it is judged whether the tie elimination process is succeeded. If it fails, the routine proceeds to step S42 where yBef is set to a lowermost y coordinate of rectCur. If judged at S34 that the tie elimination process is succeeded or if judged at S32 that the detected second label rectangle is smaller than the foregoing dxt, step S35 judges whether the second label is large enough for matching. If negative, the routine proceeds to later-described step S48 to finish the X-direction scan loop. If judged at S35 that it is large enough, step S36 first executes matching once using only the second label (rectCur). At step S37, it is judged whether the preference degree of the ID is the greatest. If judged to be the greatest, the routine proceeds to step S42 where yBef is set to a lowermost y coordinate of rectCur, and then to step S46 where head data is prepared. If judged at S37 that the preference degree is not the greatest, step S38 judges whether the coordinates of the label rectMrg to be coupled agree with the default values. If not agreeing, step S39 executes a process of coupling the first label and the second label. If agreeing, the coupling process is not carried out and the shape, as it is, is set to be a merged rectangle (rectMrg) at step S40. At step S41, the foregoing ybef is set to the a lowermost y coordinate of the foregoing rectMrg. Then at step S43, it is judged whether rectMrg is large enough for matching. If judged not to be large enough, the routine proceeds to later-described step S48 to finish the X-direction scan loop. If judged to be large enough at S43, step S44 executes matching of rectMrg with the dictionary, and step S45 judges whether the preference degree of the ID is the greatest. If judged to be the greatest, the routine proceeds to step S46 where head data is prepared using the stored head ID and the rectangle. If the preference degree is not the greatest, the routine proceeds to step S48 to finish the X-direction scan loop. After the foregoing step S46, step S47 executes a process of setting the coordinates of rectMrg to the default values (label coupling finished) and initializes the stored head ID. If S45 Judges that the preference degree is not the greatest or if S47 executes the label coupling finishing process, the X-direction scan loop is finished at step S48. Further, at step S49, Y-direction scan loop is finished. Then at step S50, it is judged whether the remaining stored head ID is in the initial state. If in the initial state, the process is finished. If not in the initial state, head data is prepared at step S51.

Figure 26:
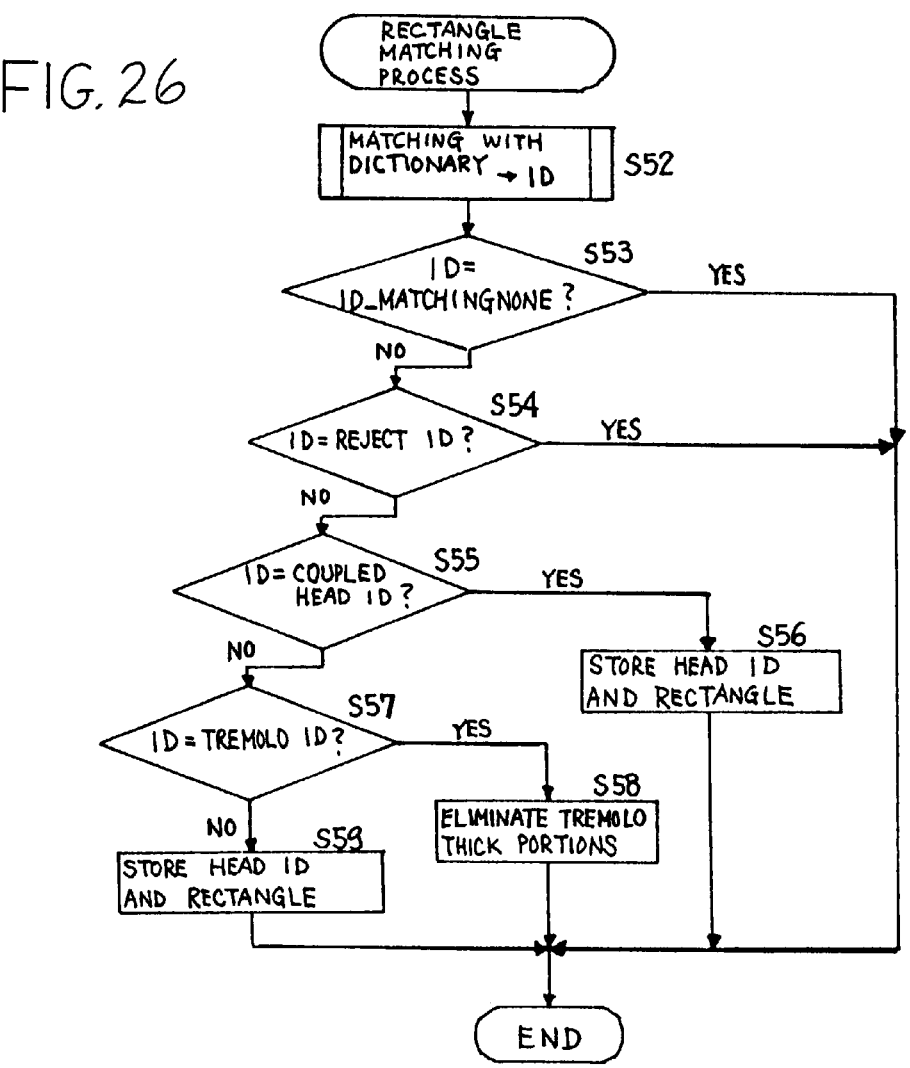
FIG. 26 is a flowchart showing the flow of a rectangle matching process.

FIG. 26 shows a flowchart of the rectangle matching processes at steps S36 and S44 in FIG. 23. At step S52, matching with the dictionary is carried out and its process result is inputted into the ID. At step S53, it is judged whether the matching is succeeded. If failure (ID_MATCHINGNONE) is judged, the process is finished. If no matching failure is judged at S53, step S54 judges whether the matching result is a reject label. If judged to be the reject label, the process is finished. If judged not to be the reject label at S54, step S55 judges whether the matching result is a coupled head. If judged to be the coupled head, the head ID and the rectangle are stored at step S56. On the other hand, if judged not to be the coupled head at S55, step S57 judges whether the matching result is a tremolo sign. If judged to be the tremolo sign, step S58 executes a process of eliminating tremolo thick portions. On the other hand, if judged not to be the tremolo sign at S57, the head ID and the rectangle are stored at step S59. After finishing the processes at S56, S58 and S59, the whole process is finished.

(3) Tie Elimination Process

Figure 27:
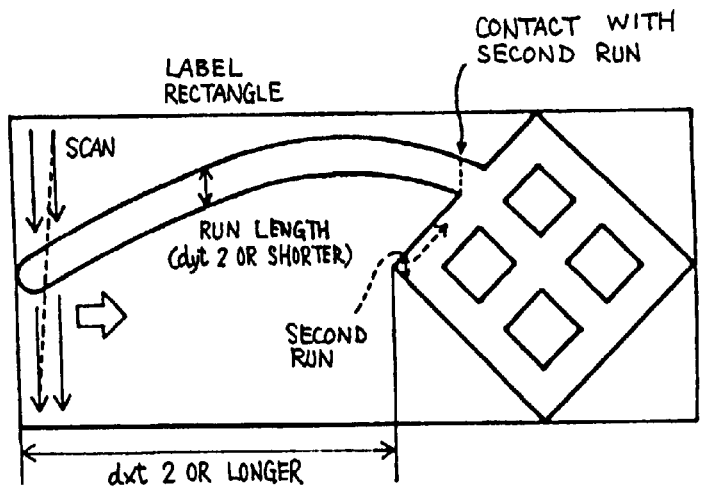
FIG. 27 is an explanatory diagram showing a tie recognition process in case of a head label abutting a tie.

As described before, if the transverse width of the label is greater than the head, it can be considered that a tie is coupled to the head. Since the label can not be separated, the tie elimination process subsequent to step S32 in FIG. 23 is carried out. As shown in FIG. 27, if longitudinal scanning is carried out in opposite directions from the left and right ends of the rectangle to find one run and if a run length is no greater than a given threshold value dyt2 and an x width is no less than a given threshold value dxt2, it can be judged to be a head. In this case, a portion up to a position where a run length exceeds the given length dyt2 (a run length of a portion of the tie contacting the head exceeds dyt2) or a position contacting a second or subsequent run (another run found in the longitudinal direction while scanning the run) is eliminated as the tie.

(4) Coupled Head Process

Figure 3:
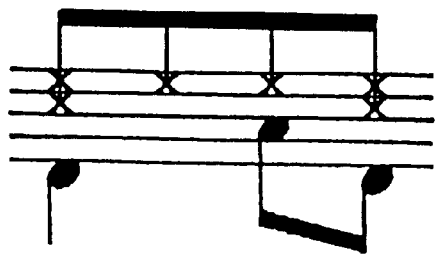
FIG. 3 is an explanatory diagram showing an example of a music score including a note with upper and lower abutting heads.

In the drum score, chords with abutting heads are small in number, and there is no problem with respect to abutment between black heads and abutment between a black head and a head other than the black head. However, if a musical instrument other than a normal drum set is notated on the same staff, it is possible that a chord with abutting heads (X) exists as shown in FIG. 3. In such a case, it is difficult to separate the respective heads and set recognition rectangles prior to the matching with the dictionary. Therefore, a coupled head, itself, with upper and lower abutting heads is recorded in the dictionary and, if matching between the dictionary and the coupled head is established (see step S55 in FIG. 26), data corresponding to the number of the heads coupled to each other is added to the head data (see step S56 in the same figure). Since such a label has a shape elongate in the longitudinal direction, the wrong recognition rate can be lowered by changing the object ID's in the dictionary depending on the longitudinal width of the label. Further, it is also effective to add to the matching itself feature amounts depending on the sizes.

(5) Tremolo Sign Process

Figure 4:
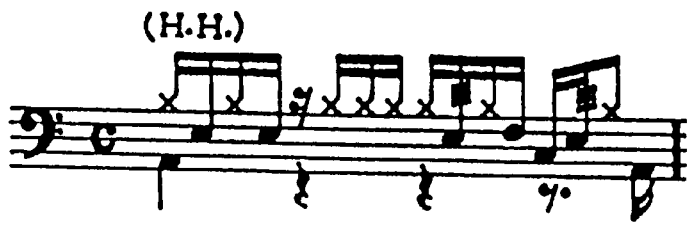
FIG. 4 is an explanatory diagram showing an example of a music score including a tremolo sign.
Figure 5:
FIG. 5 is an explanatory diagram showing an image example for a tremolo sign dictionary.
Figure 6:
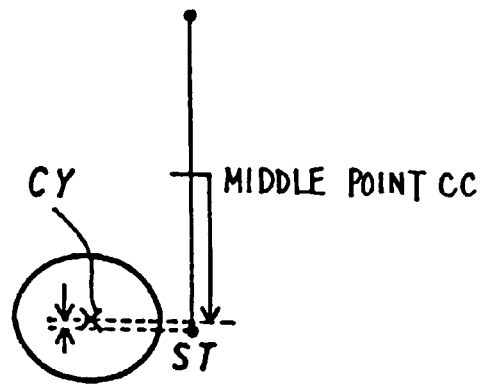
FIG. 6 is an explanatory diagram showing a positional relationship judging method in case of coupling between a head and a stem.
Figure 7:
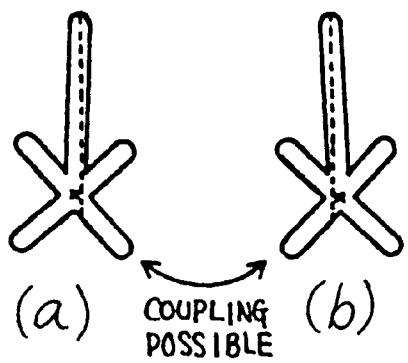
FIG. 7 is an explanatory diagram showing a coupled state of a head and a stem of a drum score.
Figure 8:
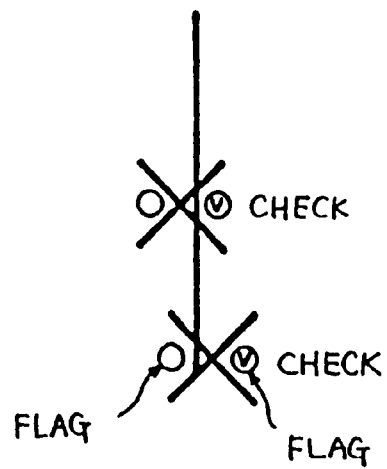
FIG. 8 is an explanatory diagram showing a check state of flags upon coupling between a head and a flag.

By performing the matching with the dictionary while coupling the labels around the stem candidate according to the foregoing procedure, a tremolo sign as shown in FIG. 4 can also be recognized. Particularly in case of the drum score, tremolo signs are relatively large in number. Since the tremolo sign has essentially the same thickness and essentially the same interval as those of linked flags, if no measure is taken, counting of flags may be carried out like in case of the linked flags so that it may be wrongly recognized as a note with a short tone length such as a thirty-second note. Therefore, the tremolo sign is recorded in the dictionary in the form as shown in FIG. 5. In this structure, however, since a sign pasting interface does not correspond to the tremolo sign, if matching with this occurs (see step S57 in FIG. 26), the process of eliminating the thick portions is carried out (see step S58 in the same figure) so as to provide a measure against the flag counting failure upon detection of the linked flags.

(6) Head Stem Coupling Process

In this structure, after recognizing the head, a process of coupling the head and the stem is carried out like what is carried out upon recognizing the normal music score. In case of the drum score, however, special processes are required even for this coupling process.

<1> Positional Relationship between Head and Stem

One reason is that, as shown in FIG. 2, in case of a head other than a black head, there is a case wherein a stem is attached to the center of the head. It is rarely that heads are attached to both sides of a stem. In such a case, after coupling the first head of the upward stem or the downward stem, the intermediate head is coupled. In such a case, in this structure, with respect to other than the black head or the white head, one of stem coupling flags on the left and right of the head is checked depending on a positional relationship between the center of an ellipse and an x coordinate of the stem and, with respect to the first head of the stem, whether to couple is judged based on this X-direction positional relationship. In case of the drum head (other than the black head), upon coupling the first head, which of the left and right is checked is determined depending on whether it is upper or lower relative to the longitudinal center of the stem. Specifically, if it is lower than the middle point, the right of the head is checked regardless of the X-direction positional relationship. With respect to the head at an intermediate position of the stem, the check direction is determined depending on whether the stem is upward or downward. The reason why the head coupling flags are used as described above is that, by disabling coupling of the stem candidate to the side where the flag is checked, double coupling of the stem is avoided.

<2> Head Dividing Stem

Another reason for carrying out the unique coupling process in case of the drum score is that there exists a head which divides a stem as shown at (a) and (b) in FIG. 9. As shown in the same figure, with respect to the head dividing the stem, such a pattern is normal wherein the first head is a black head and there exists one dividing head. Thus, in this structure, the black head is not considered at first and, as shown at (a) in FIG. 10, the head dividing the stem and its upper and lower stem candidates are coupled to each other. Then, as shown at (b) in the same figure, drum notes with oppositely oriented stems sharing such a head can be recognized. Thereafter, a stem coupling process is carried out. In this case, however, since the stem length in the state before the coupling becomes short, it is necessary that the shortest threshold value for the length of the stem to be coupled to the head is set to be small. Further, before the stem coupling process, the note with the downward stem on the right at (b) in FIG. 10 is deleted and, as shown at (c) in the same figure, the stem candidate is changed to a stem obtained by coupling the upper and lower stems (right side in the figure). Thereafter, the head stem coupling also dealing with the black head is carried out so that the stem candidate coupled in the foregoing process and the black head are coupled to each other.

<3> O Head and Hi-Hat Open

Still another reason for carrying-out the unique coupling process in case of the drum score is that, upon recognizing the O head, if (°) representing hi-hat open exists close to the stem, it is possible that it is wrongly recognized as the head. As a measure against it, in this structure, with respect to the O head, the left side is checked in advance between the left and right stem coupling flags. With this arrangement, the downward stem is not attached to the O head. However, as shown in FIG. 28, a recognition rectangle (shown by broken line in the figure) is set per part in one image and, if paragraphs are close to each other, it is possible that a sign of the next paragraph enters the recognition rectangle. In consideration of a possibility that hi-hat open of the next paragraph enters the recognition rectangle as described above and a possibility that (°) representing hi-hat open is used for the pedal hi-hat below the first line, it may also be arranged to check the right flag other than the left flag with respect to the O head below the first line.

<4> Measure against Wrong Recognition of Hi-Hat Close/ Tuplet Number

Figure 11:
FIG. 11 is an explanatory diagram showing an example of a music score including signs of hi-hat close and a tuplet number.

A sign (+) representing hi-hat close or a tuplet number as shown in FIG. 11 may be wrongly recognized as a head and, if this is coupled as the first head of the stem, it may be recognized as a completely different note with an oppositely oriented stem. As a measure against it, these sign and tuplet number may be recorded in the dictionary as reject labels. On the other hand, in this structure, by utilizing that, as different from the normal music score, the stem orientation in the drum score can be limited to a certain degree, the stem is judged to be upward when a stem upper end is above the fifth line and a stem lower end is above the first line [it is also effective as a measure against wrong recognition of hi-hat open (°)], while the stem is judged to be downward when a stem lower end is below the first line and a stem upper end is below the fifth line, so as to couple the first head and the stem candidate.

Figure 12:
FIG. 12 is an explanatory diagram showing an example of a structure wherein a downward stem is coupled to a shared head.

However, if the foregoing arrangement for judging the stem orientation is carried out when the foregoing recognition process for the head dividing the stem and the coupling process for these stem and head are carried out, it is not possible to recognize the structure wherein the downward stem is coupled to the shared head shown in FIG. 12 (since the stem is judged to be upward when the stem upper end is above the fifth line and the stem lower end is above the first line). Accordingly, in this structure, after the foregoing process for the head dividing the stem is performed, normalization of the stem orientation is executed. Specifically, upon recognizing the drum note including the note having the head dividing the stem, the coupling process for the first head and the stem candidate of the drum note is carried out. With respect to the drum note having the head dividing the stem, the drum notes with the oppositely oriented stems sharing the head are recognized, then the note with the downward stem is deleted, and then the stem candidate obtained by coupling the upper and lower stems is coupled to the remaining first head. With respect to the other drum note, the stem is judged to be upward when the stem upper end is above the fifth line and the stem lower end is above the first line, while the stem is judged to be downward when the stem lower end is below the first line and the stem upper end is below the fifth line, so as to couple the stem candidate and the remaining head, and the stem not satisfying these conditions is restored to the original stem candidate (stem orientation normalization process) and then the stem candidate and the remaining head are coupled to each other.

<5> Reduction of Wrong Recognition based on Rate of Thick Portion on Stem

Also in the normal music score, when the rate of a thick portion on the stem candidate is high, it is excluded from head coupling objects as being judged wrong recognition of the stem. In case of the drum score, since chords of black heads are small in number, the wrong recognition probability can be lowered by lowering a threshold value thereof. Particularly, in case of the drum score, since matching is carried out by dividing the head label, when the matching is performed while the label around the longitudinal line detected on the sign which is not actually the note is divided and coupled, it is possible to wrongly recognize it as a head. Thus, the foregoing process is effective.

However, since the short stem candidate exists upon processing the head dividing the stem, attention is required. For solving this, the note with the downward stem on the right at (b) in FIG. 10 is once deleted, then the stem candidate is changed to one obtained by coupling the upper and lower stems as shown at (c) in the same figure (right side in the figure), then, after executing the head stem coupling also dealing with the black head, the rate of the thick portion on the stem is detected and, if higher than the threshold value, the note is deleted.

Further, in case of the wrong recognition of the note, considering that a possibility is low to wrongly recognize the linked flags and that the rate of the thick portion of the note with linked flags is relatively high, it is also effective to carry out the check based on the thick portion rate with respect to only those with no linked flags, or to set the threshold value for checking the thick portion rate of those with no liked flags to be stricter than that for those with linked flags.

In the foregoing carrying-out mode structures, in the drum score, like in the normal music score, the black head, which is the same as that in the normal music score, is detected by the thick/thin separation process carried out by eliminating lines of the staffs etc. and the ellipse detection process for recognizing the black head portion. On the other hand, the heads of the drum score other than the black head and the white head whose appearing probability is low (recognition thereof is not performed) are described by thin lines, such as (X, ◊), and there exist various other types. They can not be detected by the thick/thin separation process and the ellipse detection process like the detection of the black head. Therefore, recognition thereof is carried out by eliminating the stem to separate the head label, and scanning the stem candidate so as to match the detected label around the stem candidate with the dictionary. Since it is possible that the head is divided into a plurality of labels due to the stem elimination, if the matching fails, scanning of the stem candidate is further continued so that the process of coupling between the next detected head label and the foregoing separated label is carried out, and then matching with the dictionary is again executed. Other than this, since there exist unique things in the drum score recognition and the coupling process, the respective unique processes are carried out as described above.

According to the structures of the inventions recited in claims 1 to 16 as described above in detail, since the recognition of the drum score is carried out while estimating the notation of each of the drum scores described by various notations, it can be converted playable data format without using the complicated interface, without burdening the user and with less operations. Further, even the user having no knowledge about the drum score can use it.

According to the structures of the inventions recited in claims 17 to 36, the recognition of the drum note in the drum score different from the normal music score can be achieved so that it can be converted into the playable and/or displayable data format. Particularly, upon recognizing the head of the drum score, the recognition is carried out by eliminating the stem to separate the head label, and scanning the stem candidate so as to match the detected label around the stem candidate with the dictionary. Since it is possible that the head is divided into a plurality of labels due to the stem elimination, if the matching fails, scanning of the stem candidate is further continued so that the process of coupling between the next detected head label and the foregoing separated label is carried out, and then matching with the dictionary is again executed. Thus, the drum note can be precisely recognized.

Industrial Applicability

As described above, the structures of the music score reading method and the computer-readable recording medium storing the music score reading program are useful for a case where a music score, particularly a drum score, is mechanically read, and particularly suitable for a case where data for a karaoke performance is prepared from a music score or a case where a manual performance is partly replaced with a mechanical performance in studio recording or live performance.

What is claimed is:

1. A music score reading method comprising:
   recognizing all signs and notes of a music score, in a sian recognizing step;
   estimating a drum notation in a drum part of the music score based on information obtained by said recognizing step, in a notation estimating step; and
   allocating actual tone generating musical instruments to the recognized signs of the drum part according to the drum notation estimated by said notation estimating step, in a musical instrument allocating step, such that the music score is converted into a readable music score data format.

2. The music score reading method according to claim 1 wherein the signs in the drum part of the music score recognized by said sign recognizing step include a head, a stem and a flag of a drum note, a sign relating to a drum note and a character string unique in a drum score, and that, upon recognizing the sign relating to the drum note, the drum note is also recognized.

3. A music score reading method according to claim 1 wherein said notation estimating step estimates the drum notation based on information obtained by a sign recognizing function and including at least a staff position of a drum head, a kind of a drum head, a hi-hat open sign relating to a drum note, a hi-hat close sign relating to a drum note, an accent sign relating to a drum note, a stem of a drum note, a flag of a drum note, a character string for designation of a drum tone of a note, a tone length determined by the flag of the drum note, and another tone length determined by a head kind based on existence of the tone length of the drum note derived by said flag.

4. A music score reading method according to claim 1 wherein said notation estimating step estimates a drum notation with respect to drum instruments other than cymbals such that, if heads exist in a third space of the staff and a black head and a head of another kind are detected, the black head is set to a snare drum while (R) or the head other than the black head is set to a rim shot and, if heads exist in the third space of the staff and only the black heads are detected and further a character string representing the rim shot is detected, the black head designated by said character string is set to the rim shot while the other black head is set to the snare drum.

5. A music score reading method according to claim 1 wherein said notation estimating step estimates a drum notation with respect to drum instruments other than cymbals such that, if a head exists below a first line of the staff and is other than a black head, said head is set to a pedal hi-hat.

6. A music score reading method according claim 1 wherein said notation estimating step estimates a drum notation with respect to drum instruments other than cymbals such that, if black heads are detected in ranges, excluding a third space, where they are notated to represent a bass drum and toms, when a lowermost step is no higher than a given pitch, the corresponding black heads are set to the bass drum while the others are set to the toms of a plurality of pitches and, when the lowermost step is higher than the given pitch, all the black heads are set to the toms of a plurality of pitches.

7. A music score reading method according to claim 1 wherein said notation estimating step estimates a drum notation with respect to drum instruments of cymbals such that, under a condition that drum heads other than a black head exist above a fourth space of the staff, drum notations are classified into a case where the drum heads exist at one staff position and a case where the drum heads exist at two staff positions, said classification is further divided depending on kinds of the drum heads and still further divided depending on tone lengths determined by flags of the drum notes and other tone lengths determined by the kinds of the heads based on existence of the tone lengths of the drum notes derived by said flags, a conversion table is prepared depending on said still further divided classification, and kinds of the drum instruments of cymbals estimated depending on the staff positions of the drum heads, the kinds of the drum heads, a hi-hat open sign relating to the drum notes, a hi-hat close sign relating to the drum notes, an accent sign relating to the drum notes and character strings for designation of drum tones of the notes are specified in the conversion table so as to estimate the drum notation based on said conversion table.

8. A music score reading method according to claim 7, characterized in that, upon allocating the actual tone generating musical instruments to the recognized signs of the drum part according to the drum notation estimated by said notation estimating step, if a value of said conversion table designates a half note relative to the drum note originally recognized as a quarter note before estimation, said drum note is converted to the half note.

9. The computer-readable recording medium storing a music score reading program comprising:
   sign recognizing function of recognizing all signs and notes of a music score;
   notation estimating function of estimating a drum notation in a drum part of the music score based on information obtained by said sign recognizing function;
   musical instrument allocating function of allocating actual tone generating musical instruments to the recognized signs of the drum part according to the drum notation estimated by said notation estimating function, such that the music score is converted into a readable music score data format.

10. The computer-readable recording medium storing a music score reading program according to claim 9, wherein the signs in the drum part of the music score recognized by said sign recognizing function include a head, a stem and a flag of a drum note, a sign relating to a drum note and a character string unique in a drum score, and that, upon recognizing the sign relating to the drum note, the drum note is also recognized.

11. A computer-readable recording medium storing a music score reading program according to claim 9 wherein said notation estimating function estimates the drum notation based on information obtained by a sign recognizing function and including at least a staff position of a drum head, a kind of a drum head, a hi-hat open sign relating to a drum note, a hi-hat close sign relating to a drum note, an accent sign relating to a drum note, a stem of a drum note, a flag of a drum note, a character string for designation of a drum tone of a note, a tone length determined by the flag of the drum note, and another tone length determined by a head kind based on existence of the tone length of the drum note derived by said flag.

12. A computer-readable recording medium storing a music score reading program according to claim 9 wherein said notation estimating function estimates a drum notation with respect to drum instruments other than cymbals such that, if heads exist in a third space of the staff and a black head and a head of another kind are detected, the black head is set to a snare drum while (R) or the head other than the black head is set to a rim shot and, if heads exist in the third space of the staff and only the black heads are detected and further a character string representing the rim shot is detected, the black head designated by said character string is set to the rim shot while the other black head is set to the snare drum.

13. A computer-readable recording medium storing a music score reading program according to claim 9 wherein said notation estimating function estimates a drum notation with respect to drum instruments other than cymbals such that, if a head exists below a first line of the staff and is other than a black head, said head is set to a pedal hi-hat.

14. A computer-readable recording medium storing a music score reading program according to claim 9 wherein said notation estimating function estimates a drum notation with respect to drum instruments other than cymbals such that, if black heads are detected in ranges, excluding a third space, where they are notated to represent a bass drum and toms, when a lowermost step is no higher than a given pitch, the corresponding black heads are set to the bass drum while the others are set to the toms of a plurality of pitches and, when the lowermost step is higher than the given pitch, all the black heads are set to the toms of a plurality of pitches.

15. A computer-readable recording medium storing a music score reading program according to claim 9 wherein said notation estimating function estimates a drum notation with respect to drum instruments of cymbals such that, under a condition that drum heads other than a black head exist above a fourth space of the staff, drum notations are classified into a case where the drum heads exist at one staff position and a case where the drum heads exist at two staff positions, said classification is further divided depending on kinds of the drum heads and still further divided depending on tone lengths determined by flags of the drum notes and other tone lengths determined by the kinds of the heads based on existence of the tone lengths of the drum notes derived by said flags, a conversion table is prepared depending on said still further divided classification, and kinds of the drum instruments of cymbals estimated depending on the staff positions of the drum heads, the kinds of the drum heads, a hi-hat open sign relating to the drum notes, a hi-hat close sign relating to the drum notes, an accent sign relating to the drum notes and character strings for designation of drum tones of the notes are specified in the conversion table so as to estimate the drum notation based on said conversion table.

16. A computer-readable recording medium storing a music score reading program according to claim 15, characterized in that, upon allocating the actual tone generating musical instruments to the recognized signs of the drum part according to the drum notation estimated by said notation estimating function, if a value of said conversion table designates a half note relative to the drum note originally recognized as a quarter note before estimation, said drum note is converted to the half note.

17. A music score reading method of reading an image of a music score to recognize music signs therein for conversion into a readable music score data format, said music score reading method comprising:
   separating a label of a head using information of a stem;
   scanning a stem candidate; and
   matching the separated label around the stem candidate with a dictionary so as to recognize a drum head sign; and
   coupling the stem candidate and the recognized drum head.

18. The music score reading method according to claim 17 further comprising:
   separating a next head label, if matching between the separated label and the dictionary fails;
   continuing to scan the stem candidate for the next head label;
   coupling the next head label with the separated label; and
   matching the next head label coupled with the separated label with the dictionary.

19. The music score reading method according to claim 18 wherein matching the next head label with the dictionary, if a recognition result of the matching has a higher preference degree, the recognition result of the matching is given priority.

20. A music score reading method according to claim 18, characterized in that the label coupling is repeatedly carried out, and preference degrees are given to recognition results respectively recognized through matching during the coupling so that the recognition results are determined in the order of higher preference degrees.

21. The music score reading method according to claim 17 wherein separating a label includes eliminating a tie abutting a head, and recognizing a drum note including the head in abutment with the tie.

22. The music score reading method according to claim 17 further comprising:

recording a coupled head with upper and lower abutting heads in the dictionary; and matching a new coupled head to the dictionary to recognize the new coupled head.

23. The music score reading method according to claim 17 further comprising recording a tremolo sign in the dictionary and, after a tremolo sign is recognized and eliminated, recognizing a drum note which was displayed with the tremolo sign.

24. The music score reading method according to claim 17 further comprising:

recognizing a drum note having a head dividing a stem;

coupling the head dividing the stem to an upper and lower stem candidate;

recognizing drum notes with oppositely oriented stems sharing the head;

deleting the drum note with a downward stem; and coupling the upper and lower stems to be a stem candidate which is then coupled to a remaining head.

25. The music score reading method according to claim 17 further comprising:

judging a stem to be upward when a stem upper end extends above the staff and a stem lower end does not extend below the staff; and judging the stem to be downward when the stem lower end extends below the staff and the stem upper end does not extend above the staff, so as to couple a first head and the stem candidate.

26. A music score reading method according to claim 24, characterized in that, upon recognizing the drum note including the note having the head dividing the stem, a coupling process for a first head and the stem candidate of the drum note is carried out and, with respect to the drum note having the head dividing the stem, the drum notes with the oppositely oriented stems sharing said head are recognized, then the note with the downward stem is deleted, and then the stem candidate obtained by coupling the upper and lower stems is coupled to the remaining first head and, with respect to the other drum note, the stem is judged to be upward when a stem upper end extends above the staff and a stem lower end does not extend below the staff, while the stem is judged to be downward when the stem lower end extends below the staff and the stem upper end does not extend above the staff, so as to couple the stem candidate and the remaining head, and the stem not satisfying these conditions is restored to the original stem candidate and then the stem candidate and the remaining head are coupled to each other.

27. A computer-readable recording medium storing a music score reading program for reading an image of a music score to recognize music signs therein for conversion into a readable music score data format, the music score reading program comprising:

label separating function of separating a head label using information of a stem;

scanning function of scanning a stem candidate;

recognizing function of matching the separated label around the stem candidate detected by said scanning with a dictionary so as to recognize a drum head; and coupling function of coupling the recognized drum head and the stem candidate.

28. The computer-readable recording medium storing a music score reading program according to claim 27 further comprising:

matching judging function of judging whether matching between the separated label and the dictionary is successful; and label coupling function of, if the matching fails, causing said scanning function to continue scanning of the stem candidate and coupling a next detected head label and said separated label, wherein after the label coupling, said recognizing function matches a coupled label and the dictionary.

29. The computer-readable recording medium storing a music score reading program according to claim 28 wherein said recognizing function matches the next detected head label used in the label coupling with the dictionary and, if a recognition result of the matching has a higher preference degree, the recognition result of the matching is given priority.

30. The computer-readable recording medium storing a music score reading program according to claim 28 further comprising preference degree assigning function of assigning preference degrees to recognition results respectively recognized through matching during head recognition while the head recognition and the label coupling are repeatedly carried out, wherein said recognizing function arranges the recognition results in the order of higher preference degrees.

31. The computer-readable recording medium of storing a music reading program according to claim 27 further comprising tie elimination function of eliminating a tie abutting a head, wherein said label separating function performs label separation after the elimination, and said recognizing function recognizes the head in abutment with the tie.

32. The computer-readable recording medium storing a music reading program according to claim 27 wherein a coupled head with upper and lower abutting heads is recorded in the dictionary, and said recognizing function performs matching between the dictionary and another coupled head to recognize the another coupled head.

33. The computer-readable recording medium storing a music score reading program according to claim 27 wherein a tremolo sign is recorded in the dictionary such that said recognizing function recognizes the tremolo sign and further including sign eliminating function of eliminating the tremolo sign and, after the elimination, the recognition function recognizes a drum note displayed with the tremolo sign.

34. The computer-readable recording medium storing a music score reading program according to claim 27 wherein upon recognizing a drum note having a head dividing a stem and a first drum note having a first head, said coupling function couples the head dividing the stem and its upper and lower stem candidates and then said recognizing function recognizes drum notes with oppositely oriented stems sharing said head, and further including downward note deleting function of deleting the drum notes with the downward stem and a stem coupling function of coupling the upper and lower stem candidates, wherein the coupled upper and lower stem candidates are set to be a stem candidate which is then coupled to the first head by said coupling function.

35. The computer-readable recording medium storing a music score reading program according to claim 27 further comprising stem orientation judging function of judging a stem to be upward when a stem upper end extends above the staff and a stem lower end does not extend below the staff and judging the stem to be downward when the stem lower end extends below the staff and the stem upper end does extend above the staff, wherein after the judgement, said coupling function couples a first head and the stem candidate.

36. A computer-readable recording medium storing a music score reading program according to claim 34, characterized in that, upon recognizing the drum note including the note having the head dividing the stem, said coupling function performs a coupling process for a first head and the stem candidate of the drum note and, with respect to the drum note having the head dividing the stem, said recognizing function recognizes the drum notes with the oppositely oriented stems sharing said head, then said downward note deleting function deletes the note with the downward stem, and then the stem candidate obtained by coupling the upper and lower stems by said stem coupling function is coupled to the remaining first head by said coupling function and, with respect to the other drum note, said stem orientation judging function judges the stem to be upward when a stem upper end extends above the staff and a stem lower end does not extend below the staff, while judging the stem to be downward when the stem lower end extends below the staff and the stem upper end does not extend above the staff, so as to couple the stem candidate and the remaining head by said coupling function, and characterized by further including a program for executing a stem candidate restoring function of restoring the stem not satisfying these conditions to the original stem candidate, wherein, after restoration to the original stem candidate, the coupling function couples the stem candidate and the remaining head to each other.

* * * * *

UNITED STATES PATENT AND TRADEMARK OFFICE
CERTIFICATE OF CORRECTION

PATENT NO. : 6,137,041
DATED : October 24, 2000
INVENTOR(S) : Seiji Nakano

It is certified that error appears in the above-identified patent and that said Letters Patent is hereby corrected as shown below:

Title page,
Item [73], Assignee, should read as follows:
-- Kabushiki Kaisha Kawai Gakki Seisakusho, Hamamatsu, Japan --.

Column 31,
Line 57, replace "sian" with -- sign --.

Column 32,
Line 38, after "according" insert -- to --.

Signed and Sealed this

Thirteenth Day of August, 2002

Attest:

Attesting Officer

JAMES E. ROGAN
Director of the United States Patent and Trademark Office